(12) United States Patent
Loveless et al.

(10) Patent No.: US 6,274,857 B1
(45) Date of Patent: Aug. 14, 2001

(54) INDUCTION HEAT TREATMENT OF COMPLEX-SHAPED WORKPIECES

(75) Inventors: Don L. Loveless, Rochester; Valery I. Rudnev, Rochester Hills; Loran A. Lankford, Howell; Glenville C. Desmier, Novi, all of MI (US)

(73) Assignee: Inductoheat, Inc., Madison Heights, MI (US)

( * ) Notice: Subject to any disclaimer, the term of this patent is extended or adjusted under 35 U.S.C. 154(b) by 0 days.

(21) Appl. No.: 09/652,570

(22) Filed: Aug. 31, 2000

Related U.S. Application Data
(60) Provisional application No. 60/181,513, filed on Feb. 10, 2000.

(51) Int. Cl.[7] .............................. H05B 6/10; H05B 6/40
(52) U.S. Cl. ........................ 219/639; 219/652; 219/673; 219/676; 148/572; 266/129
(58) Field of Search ...................... 219/639, 635, 219/652, 656, 672, 673, 676; 148/572, 573, 567; 266/129

(56) References Cited

U.S. PATENT DOCUMENTS

| | | | |
|---|---|---|---|
| 2,676,242 | 4/1954 | Witsenburg | 219/10.57 |
| 3,188,440 | 6/1965 | Wokas | 219/10.43 |
| 4,043,847 | 8/1977 | Just | 148/146 |
| 4,459,451 | * 7/1984 | Regele | 219/652 |
| 4,535,211 | 8/1985 | Carter | 219/10.49 |
| 5,680,693 | 10/1997 | Griebel et al. | 29/602.1 |
| 6,013,904 | * 1/2000 | Storm et al. | 219/639 |
| 6,160,248 | * 12/2000 | Ottenwaelder et al. | 219/639 |

FOREIGN PATENT DOCUMENTS 432695    10/1971    (SU) .

OTHER PUBLICATIONS

Demichev, A.D. *Induction Surface Hardening*, Lenningrad (St. Petersburg), Russia, 1979, pp. 45–47.

* cited by examiner

*Primary Examiner*—Philip H. Leung
(74) *Attorney, Agent, or Firm*—Drinker Biddle & Reath LLP

(57) ABSTRACT

A multi-station induction heat treatment system is used for heat treating metal workpieces that have multiple generally cylindrical components whose axes are parallel to and offset from a common workpiece axis. The heat treatment system includes heat treatment stations that heat treat while the workpiece and inductor components are stationary. The system is particularly suited to the heat treatment of workpieces, such as crankshafts, that have an intervening non-symmetrically shaped component between two substantially cylindrically shaped components, some of which are not coaxial, that must be heat-treated.

61 Claims, 27 Drawing Sheets

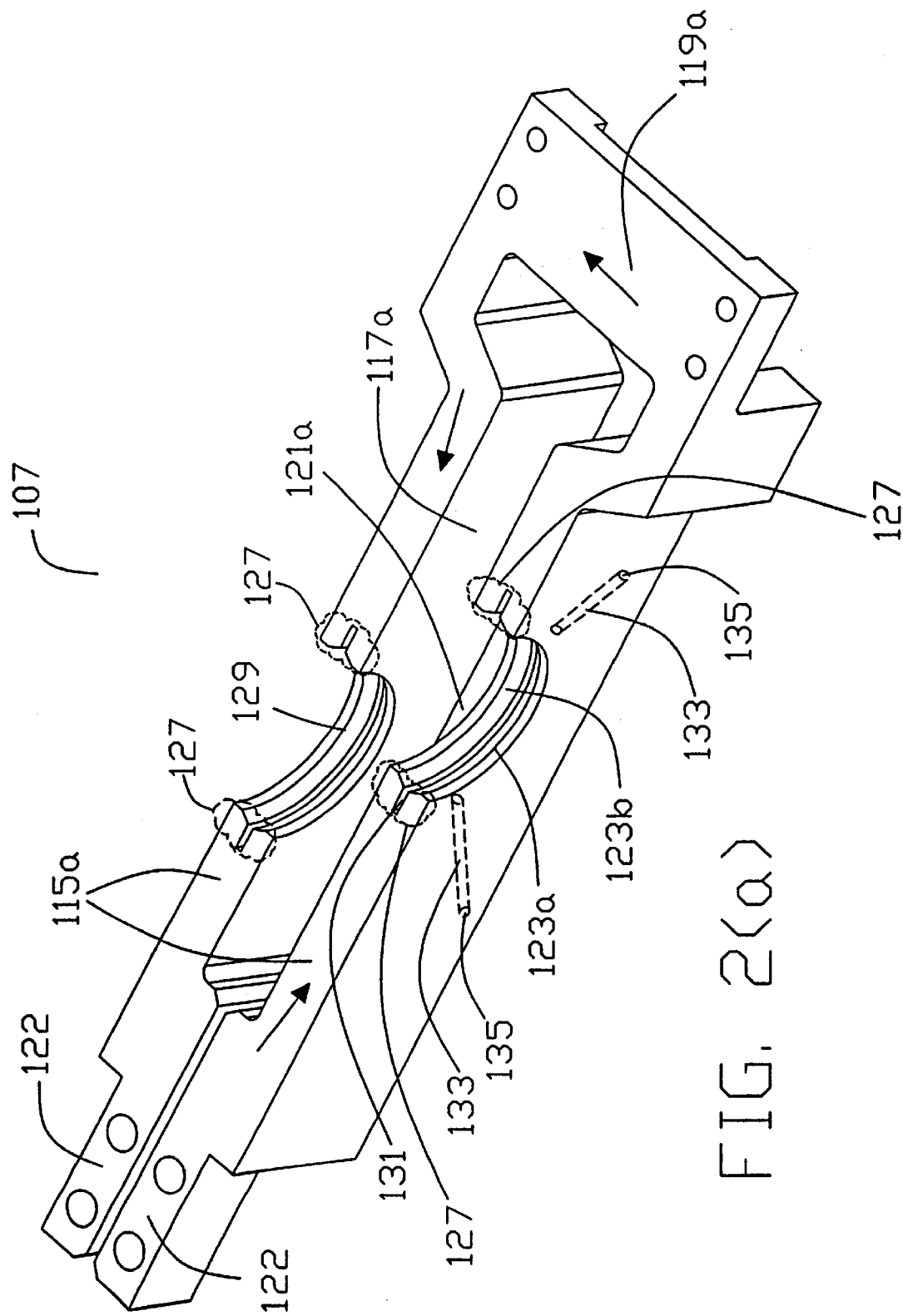

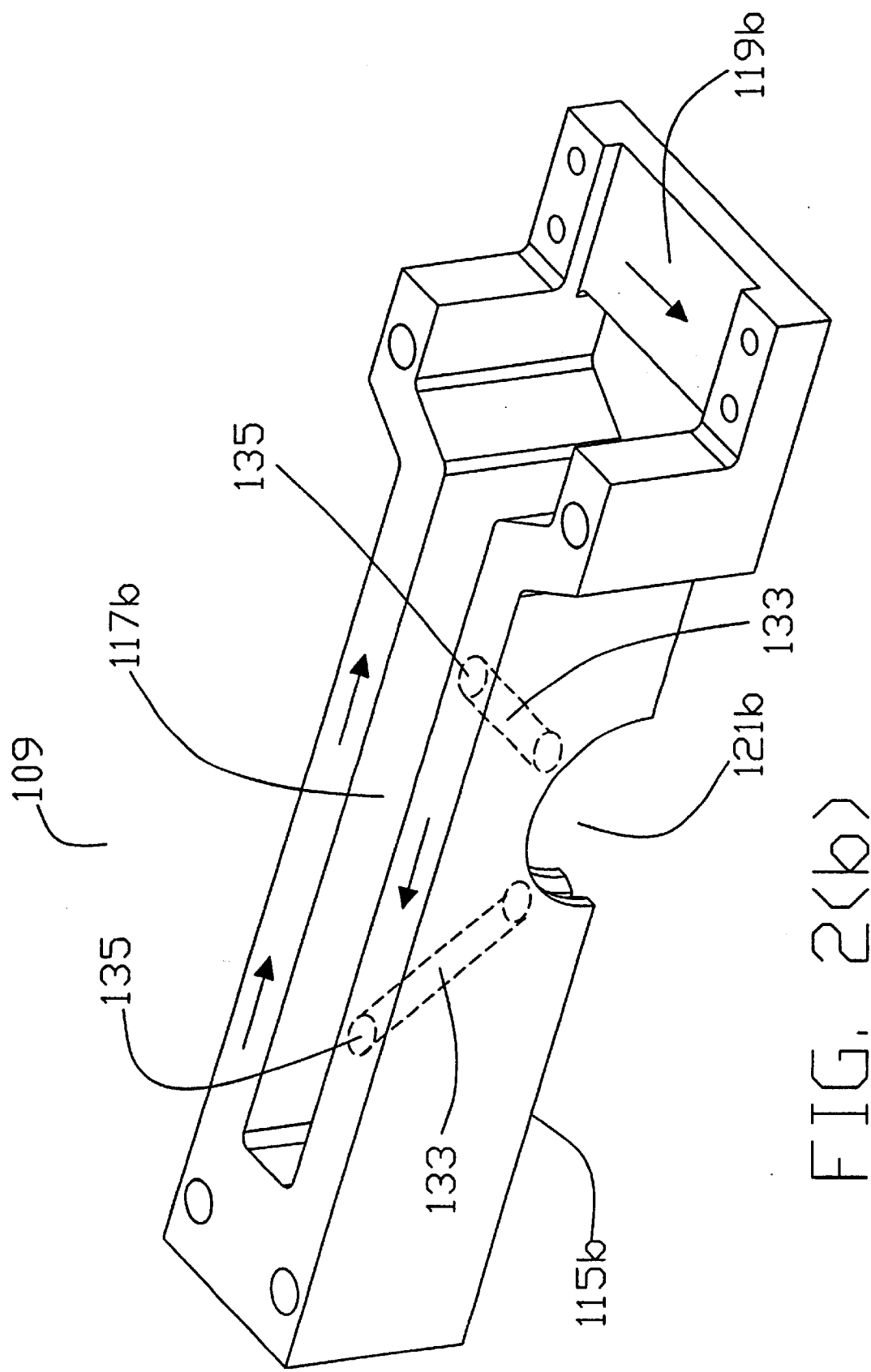

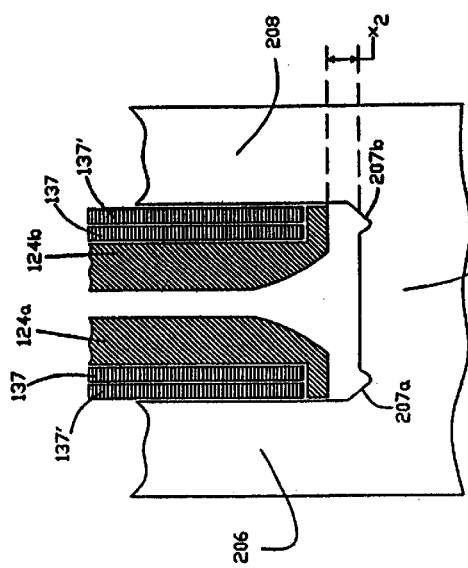
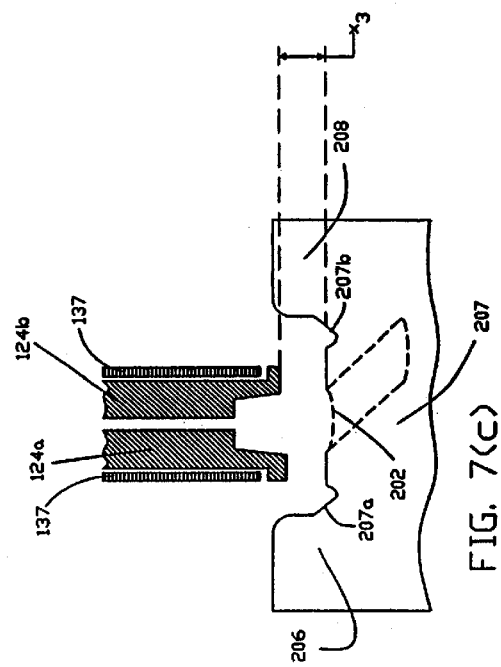
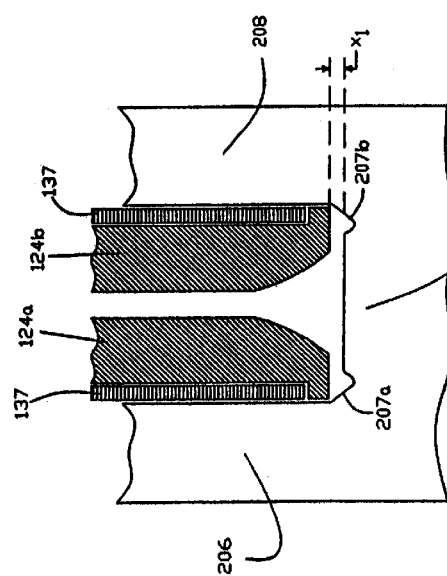
FIG. 7(a)
FIG. 7(b)
FIG. 7(c)

INDUCTION HEAT TREATMENT OF COMPLEX-SHAPED WORKPIECES

CROSS-REFERENCE TO RELATED APPLICATIONS

This application claims the benefit of U.S. Provisional Application No. 60/181,513 filed Feb. 10, 2000.

FIELD OF THE INVENTION

The present invention relates to the induction heat treatment of complex-shaped metal workpieces that include multiple generally cylindrical components whose axes are parallel to and offset from a common workpiece axis, and more specifically, to the induction heat treatment of a crankshaft.

BACKGROUND OF THE INVENTION

A cylindrical metal workpiece lends itself to induction heat treatment by axial rotation of the workpiece around a stationary arcuate inductor coil having a curvature somewhat greater than the outer radial curvature of the workpiece. Metal workpieces that include substantially cylindrical, non-concentric components, such as crankshafts used in internal combustion engines, pumps, compressors and the like, are more difficult to effectively harden and temper by induction heating. A crankshaft, typically cast or forged in one piece, comprises a series of crankpins (pins) and main journals (mains) interconnected by webs. While all pins (and mains) are in the shape of substantially right circular cylinders, each web is individually shaped to serve as a balance weight for a particular crankshaft design. In alternate crankshaft configurations, double-width (common) pins, which are twice the axial length of a standard pin, may be used. Also two pins may be connected to each other (rather than separated by a web) with offset pin axes in a configuration known as split pin. Consequently, the shape of each web can deviate substantially from that of a solid right circular cylinder. The cylindrical surfaces of the pins and mains are the seating surfaces for the connecting-rod bearings and main bearings, respectively, and are referred to as the pin and main bearing surfaces. All mains have a common axis of rotation, which is referred to as the main axis. The axis of each pin, or pin axis, is offset radially from the main axis. Skewed passages are drilled through adjacent mains, webs and pins to provide a lubricating fluid path from the main bearing surfaces to the pin bearing surfaces. The passages terminate in skewed openings in the bearing surface of the mains and pins. Additionally, one or more crankshaft terminating components, such as oil seals, flywheel attachments and crank noses, are typically attached to either end of the crankshaft. The transitional area defined by the circumferential boundary between each pin and main and its adjacent webs is typically called the fillet. Pin and main bearing surfaces are hardened and tempered by heat treatment to achieve a hard high wear and seizure resistant surface. The fillets are hardened and tempered by heat treatment or mechanical roll hardening to improve crankshaft performance since the fillets are subjected to high stresses due to bending moments during use of the crankshaft. Heat treatment of only pin and main bearing surfaces, or those surfaces along with the fillets associated with the surfaces, is selected based upon a particular crankshaft design.

Each pin and main can be induction heat treated by bringing a generally conformal U-shaped inductor close to the pin or main bearing surface while the crankshaft is rotated about its main axis. Since the pin axis is radially offset from the main axis, the pin will orbit around the main axis. Consequently, the U-shaped inductor must travel with the orbital motion of the pin for 360-degrees heat treatment of the pin. U.S. Pat. Nos. 3,188,440 and 5,680,693 disclose an inductor and process for this type of heat treatment. The major disadvantage of this approach is the requirement that the inductor moves in a plane perpendicular to the direction of the pin axis during the heat treatment process. Consequently, complex and massive components for the inductor assembly, inductor motion control, and power supplies are required for coordinating the rotation of the pin with the inductor. Maintaining an optimum spatial relationship between the pin and inductor is inherently difficult due to the dual motion of the pin and inductor during the heat treatment process. Carbide guides extending beyond the face of the U-shaped inductor ride on the pin as it is heat-treated. The carbide wears during the heat treatment process and results in deviations from the optimum air gap between the face of the inductor coil and the pin or main. Deviation from the optimum air gap results in uneven heating. Essentially, wear of carbide guides results in premature coil failure. Since the U-shaped inductor assemblies must move during the heat treatment process it is preferred that they be light weight and small. However, these design constraints compromise the strength and robustness of the process and coil assembly. Circumferential variation of web shapes, and the existence of holes in the pins and mains, requires a complex control system that applies varying induction power levels over a heat treatment cycle. Moreover, rotation of the crankshaft (and the associated holes and webs) during heat treatment makes the control of induction power levels around those features virtually impossible.

Therefore, there exists the need for a relatively simple method of heat treating crankshafts and other metal workpieces that include multiple generally cylindrical components whose axes are parallel to and offset from a common workpiece axis, and compact apparatus to achieve improved hardening and tempering of such metal workpieces.

In the present invention, during heat treatment, the crankshaft and inductor are stationary at one or more heat treatment stations during the hardening and tempering processes. The crankshaft is transferred between each station with a workpiece transport system and properly positioned at each station to heat a pre-selected number of workpiece components. The apparatus and process results in a significant reduction in the complexity of the heat treatment process that can be accomplished with compact and unitized components while maintaining comparable production rates achieved with rotation of the crankshaft during heat treatment. The crankshaft is more accurately hardened and tempered with improved mechanical properties.

SUMMARY OF THE INVENTION

In one aspect, the present invention is an induction heat treatment station for the heat treatment of a metal workpiece, such as a crankshaft, that has one or more substantially cylindrical workpiece components axially offset and parallel to the main axis of the workpiece and two or more substantially cylindrical workpiece components axially aligned with the main axis of the workpiece. Each axially aligned and axially offset workpiece component is connected to an adjoining non-heat treated irregularly-shaped component. The system can be installed on a unitized foundational structure and has at least one ac high frequency power supply. The system has at least one station for induction heat treatment of pre-selected workpiece components. Each station includes a first and second pallet assembly. The first pallet assembly has at least one first magnetic flux concentrator segment and at least one first inductor segment. The first inductor segment has an interior through opening that forms first and second inductor coil segments on opposing sides of the interior opening. Either one or both of the first and second inductor coil segments has a first partial component opening. The first inductor segment also has a means for connecting it to the power supply and means for placing the first magnetic flux concentrator segment partially around a flux concentrator area of the segment. A separate load-matching transformer may be provided between the power supply and the power supply connecting means for the first inductor segment. The second pallet assembly has at least one second magnetic flux concentrator segment and at least one second inductor segment. The second inductor segment has an interior through opening that forms third and fourth inductor coil segments on opposing sides of the interior opening. Each one or both of the third and fourth coil segments has a second partial component opening. The second inductor segment also has means for placing the second magnetic flux concentrator segment partially around a flux concentrator area of the segment. A dielectric material is placed on the facing surface of either the first or second inductor segment. A workpiece transport system is provided to transport the metal workpiece to and from each heat treatment station. Means are provided for selectively moving the second pallet assembly away from or adjacent to the first pallet assembly. When the second pallet assembly is adjacent to the first pallet assembly, the facing surfaces of the first and second inductor segments are adjacent to each other so that corresponding first and second partial component openings form a substantially closed inductor within which one of the pre-selected workpiece components is sited. Facing surfaces of the first and second magnetic flux concentrator segments are also adjacent to each other when the second pallet assembly is adjacent to the first pallet assembly. The pre-selected workpiece component sited in each substantially closed inductor is heat treated by a magnetic field generated by the closed inductor in response to excitation by high frequency ac current from the power supply. The substantially closed inductor can have a substantially circular or ovoid shape, along with profiling of the inductor, to shape the magnetic field in a manner that accommodates voids, such as holes, in the pre-selected workpiece component to be heat treated in the closed inductor. Various configurations are possible for the first and second flux magnetic concentrator segments. Each station can include a workpiece positioning system to properly orient the metal workpiece when it is seated in a station. If quenching is required for a pre-selected workpiece component, the heat treatment system can include a quenching system. The first and second inductor segments can be fabricated from a solid copper block. If a solid copper block is used and quenchant is required, internal passages in the copper block can be provided to supply quenchant to the pre-selected workpiece component. Laminated side shields can be used on one or more sides of the first and second inductor coil segments in the region adjacent to a first or second partial component opening. Each pair of first and second partial workpiece openings can be formed into an arcuate coil surface that has an orifice that defines a pair of coil lips. The coil lips may be profiled to control the distribution of the generated magnetic field relative to features in the pre-selected workpiece component, such as a hole, or features in workpiece components adjoining the selected workpiece component.

In another aspect, the present invention is a method of heat treating pre-selected components of a metal workpiece that has at least two first substantially cylindrical components arranged coaxially along the main axis of the workpiece, and one or more second substantially cylindrical components interposed between the first substantially cylindrical components. Each of the second substantially cylindrical components has an independent axis offset from and in parallel with the main axis. Each of the first and second substantially cylindrical components is connected to an adjacent non-heat treated irregularly-shaped component. The metal workpiece is engaged and transported to an induction heat treatment station. The workpiece is rotated to angularly orient each one of the pre-selected second substantially cylindrical components for siting within each one of stationary partial inductor openings in the induction heat treatment station. The workpiece is translated to axially orient each one of the pre-selected first and second substantially cylindrical components for siting within each one of stationary partial inductor openings in the induction heat treatment station. The workpiece is seated in the induction heat treatment station and a non-stationary partial inductor is brought adjacent to each one of the stationary partial inductor openings to form a substantially closed inductor around each one of the pre-selected first and second substantially cylindrical components. High frequency ac current is applied to each one of the stationary partial inductors. The high frequency ac current is inductively coupled to each one of the non-stationary partial inductors. The pre-selected first and second substantially cylindrical components are inductively heated by imposing a magnetic field established by the ac high frequency current on the pre-selected components. The non-stationary partial inductors are positioned away from the stationary partial inductors and the metal workpiece is transported from the induction heat treatment station.

In another aspect, the present invention is an inductor for heat treating at least one substantially cylindrical component of a metal workpiece wherein the substantially cylindrical component is attached on at least one side to an irregularly-shaped component to form a fillet between the irregularly-shaped component and the substantially cylindrical component. The inductor is formed from first and second inductor segments and the second inductor segment is magnetically coupled to the first inductor segment. The first inductor segment is connected to an ac high frequency power source. A substantially closed opening is formed partially in the first inductor segment and partially in the second inductor segment for placement of the substantially cylindrical component for heating by application of a magnetic field generated by the inductor formed from the first and second inductor segments in response to excitation by high frequency ac current from the ac high frequency power supply. The first inductor segment is formed from a solid electrically conductive material. The first inductor segment has a first facing surface and a through opening forming first and second coil segments disposed on opposing sides of the through opening. A first partial opening in either the first or second coil segment has an arcuate coil surface divided by an orifice to form a first pair of coils lips. The first pair of coil lips form interface regions with the adjoining first facing surface. The first pair of coil lips are profiled to selectively compensate for the irregular mass of the irregularly-shaped component, an opening on the surface of the substantially cylindrical component, or selective heating of the fillet.

The second inductor segment is formed from a solid electrically conductive material. The second inductor segment has a second facing surface disposed substantially adjacent to and electrically isolated from the first facing surface. A through opening in the second inductor segment forms third and second coil segments disposed on opposing sides of the through opening. A second partial opening in either the third or fourth coil segment has an arcuate coil surface divided by an orifice to form a second pair of coils lips. The second pair of coil lips form interface regions with the adjoining second facing surface. The second pair of coil lips are profiled to selectively compensate for the irregular mass of the irregularly-shaped component, an opening on the surface of the substantially cylindrical component, or selective heating of the fillet.

These and other aspects of the invention will be apparent from the following description and the appended claims.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 7(a) is a partial cross sectional view of a workpiece component sited in a partial workpiece opening along with its adjoining components and inductor coil with side shields, as indicated by section line A—A in FIG. 6(a), for heat treating the surface and fillets of the workpiece component.

FIG. 7(b) is a partial cross sectional view of a workpiece component sited in a partial workpiece opening along with its adjoining components and inductor coil with multiple side shields, as indicated by section line B—B in FIG. 6(a), for heat treating of the surface and fillets of the workpiece component.

FIG. 7(c) is a partial cross sectional view of a workpiece component sited in a partial workpiece opening along with its adjoining components and inductor coil shaped to heat treat a workpiece component having a hole, or voids resulting from small adjoining components, or both, as indicated by section line C—C in FIG. 6(a), for heat treating the surface and fillets of the workpiece component.

DETAILED DESCRIPTION OF THE INVENTION

Figure 1A:
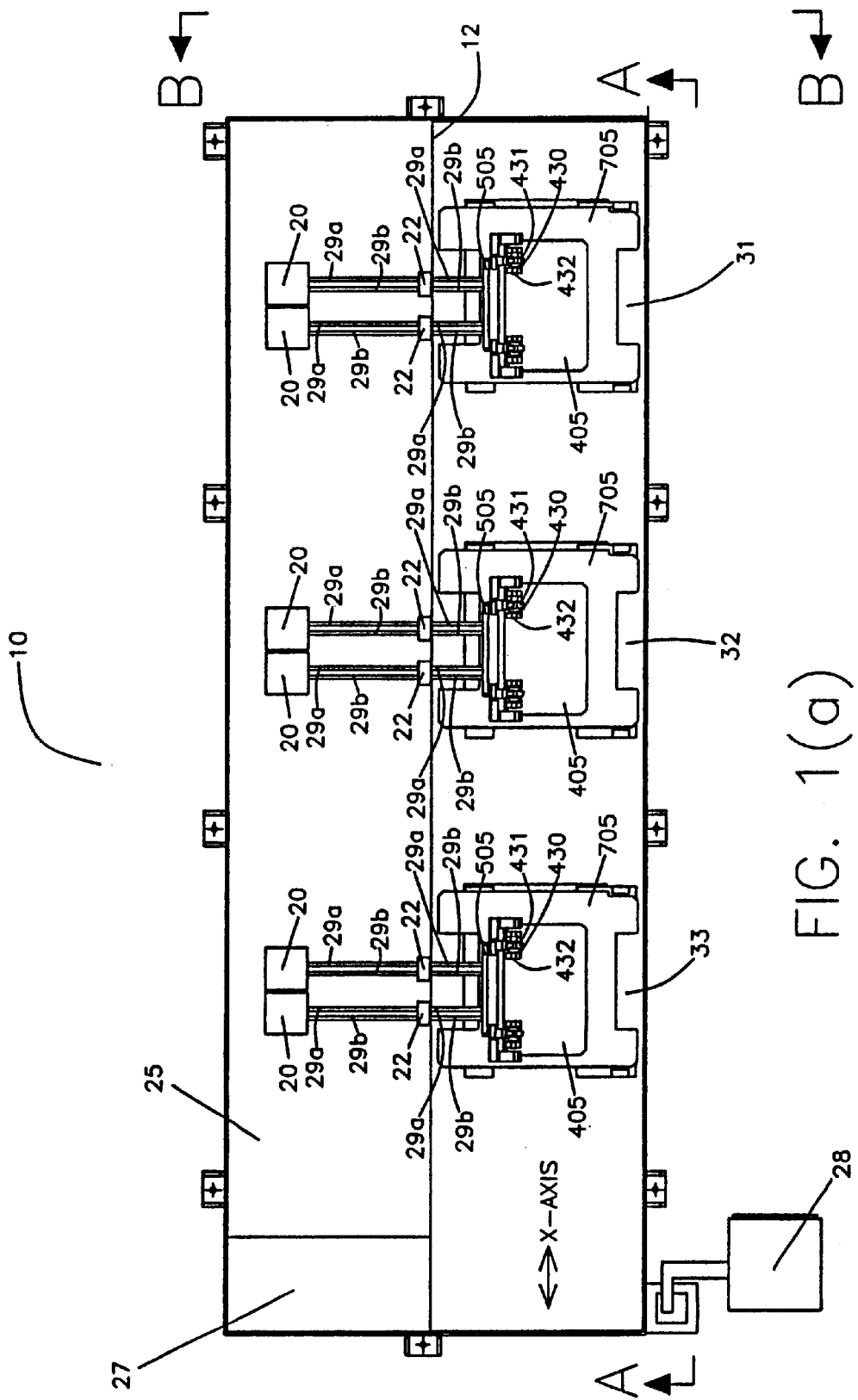
FIG. 1(a) is a plan view of one embodiment of the induction heat treatment system of the present invention.
Figure 1B:
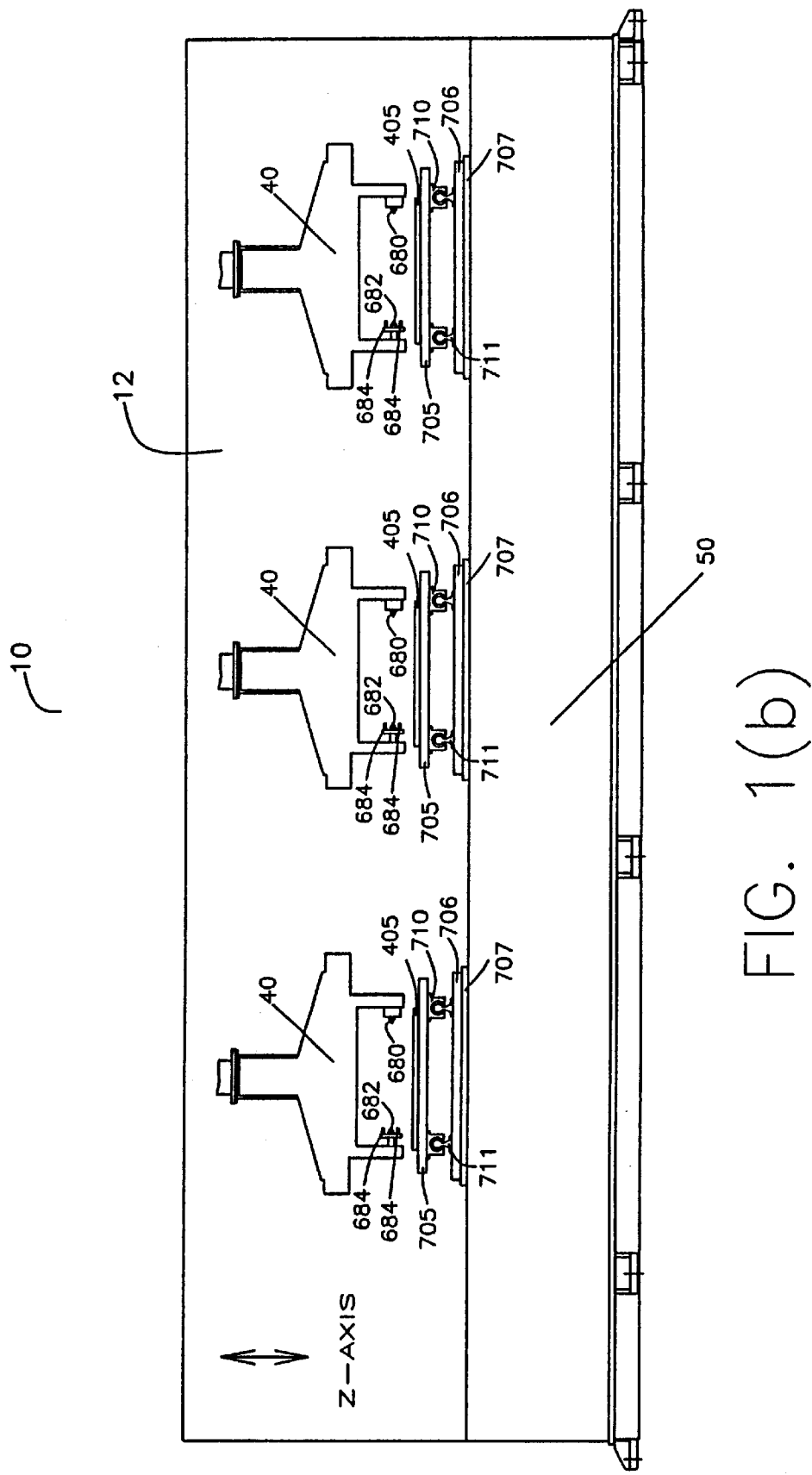
FIG. 1(b) is a partial front elevation view of the induction heat treatment system of FIG. 1(a) as indicated by section line A—A in FIG. 1(a).
Figure 1C:
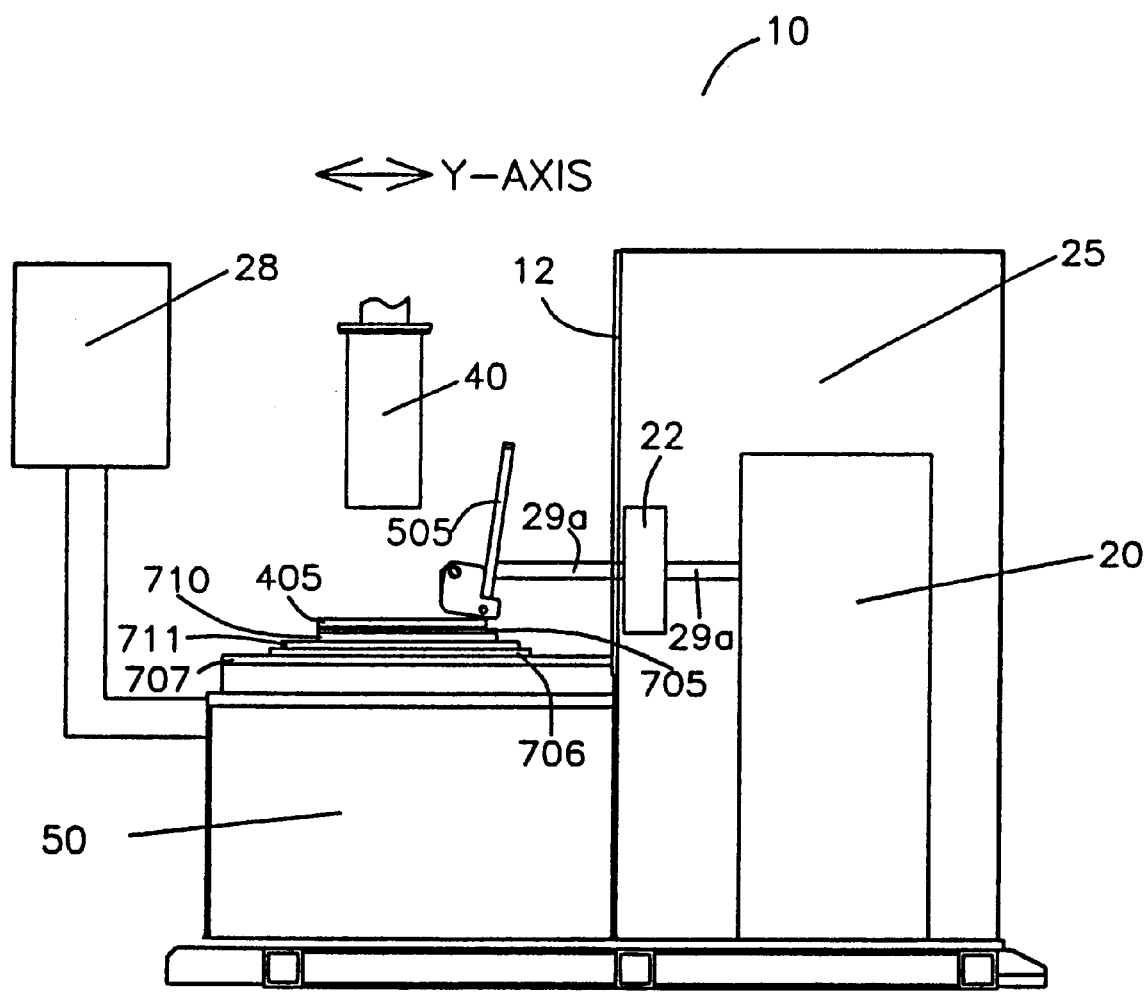
FIG. 1(c) is a side elevation view of the induction heat treatment system of FIG. 1(a) as indicated by section line B—B in FIG. 1(a).

Referring now to the drawings, wherein like numerals indicate like elements, there is shown in FIG. 1(a) through FIG. 1(c), in accordance with the present invention, one embodiment of an induction heat treatment system 10 for the heat treatment of a metal workpiece having one or more components whose axes are parallel to and offset from a common workpiece axis.

The induction heat treatment system 10 includes a foundational structure (not shown in the drawings) to which the heat treatment system components are installed. In a preferred embodiment, interconnected beams, plates and other structural elements are used to form a unitized foundational structure for the induction heat treatment system. The advantage of providing a unitized foundational structure is that the induction heat treatment system 10 can be shipped and otherwise transported in a convenient manner. In other embodiments of the heat treatment system, discrete foundational structures may be provided for the various components of the system.

One or more inductor power supplies 20 are housed in electrical enclosure 25. The power supplies are ac high frequency power supplies generally known in the art and can be powered from site utility power. Typical ratings for the supplies are in the range of 100 to 500 kW with an operating frequency of 3 kHz to 60 kHz. The single phase, two-conductor output of each power supply is connected to the primary winding terminals of a load matching transformer 22. Electrical conductors 29a and 29b, such as bus bars, provide power from the secondary winding terminals of each transformer to its associated bottom inductor segment as shown for bottom inductor segments 107 and 107a in FIG. 2(c) and further described below. While dedicated power supplies are shown for each bottom inductor segment, in alternative embodiments a single power supply, or combination of power supplies, may be used with one or more switching (mechanical or electronic) output buses to provide power to more than one bottom inductor segment from a single supply. Alternatively, a transformer and bus bar assembly can be arranged for transfer between stations. The load-matching transformer 22 may also be incorporated into the power supply 20.

A quenching system can be provided with the heat treatment system 10 to provide a means of rapid cooling to harden pre-selected heat-treated workpiece components. A quenchant, generally comprising a mixture of water, organic polymers and corrosion inhibitors, is circulated and conditioned through a distributed fluid system. The quenchant is pumped through piping and other passages, as further described below, to spray upon and rapidly cool pre-selected heated workpiece components seated in a heat treatment station's pallet assembly. Released quenchant flows by gravity feed to the quenchant contaminant reservoir tank 50 positioned under the heat treatment stations. While not shown in the drawings, the quenching system will typically include an electrically driven pump for pumping spent quenchant from tank 50 through filtering, heat exchanger and flow control valves for release of quenchant during quenching.

The induction heat treatment system 10 includes a workpiece transport system, shown in one embodiment as an X-Z axes electrically driven crane 40 travelling on a gantry (not shown in the figures). The gantry can be supported from wall 12 of electrical enclosure 25 and cantilevered outward and toward the center of the heat treatment stations. Relative to the heat treatment system shown in the figures, X-axis translation refers to lateral movement of the workpiece and Z-axis translation refers to vertical movement of the workpiece as illustrated by the arrows in FIG. 1(*a*) and FIG. 1(*b*). While further details of the heat treatment system 10 are described below, the overall process is described relative to the operation of the workpiece transport system. In typical operation, the crane 40 engages a workpiece to be heat treated at a load station (not shown in the drawings) that is typically located adjacent to the first heat treatment station 31, and transfers it to a pre-determined position over station 31. The crane 40 lowers a workpiece to station 31 and interacts with a workpiece positioning system (described below) to properly seat the workpiece in station 31. The crane 40 disengages the seated workpiece and rises to clear the top pallet assembly 500 of the heat treatment station. The top pallet assembly 500 pivots toward the bottom pallet assembly 400 of the heat treatment pallet assembly to a closed position. For clarity, in FIG. 1(*a*) through FIG. 1(*c*), the complete top and bottom pallet assemblies are not shown. However, for reference to the assemblies, the back plate 505, which forms a part of the top pallet assembly, and the base plate 405, which forms a part of the bottom pallet assembly, are shown. In the closed position, a substantially closed inductor is formed around one or more pre-selected workpiece components to be heat-treated in station 31. Pre-selection of components for heat treatment at each station is based upon a particular arrangement and configuration of heat treatment stations to provide heat treatment of all required workpiece components in the provided stations. Power is applied to each bottom inductor segment via electrical conductors 29*a* and 29*b*, such as bus bars, from the appropriate power supply's load matching transformer 22. After heating and quenching (if desired), the top pallet assembly 500 pivots away from the bottom pallet assembly 400 to an opened position that will permit crane 40 to lower and engage the workpiece seated in station 31. After engagement, the crane 40 lifts the workpiece and translates it to station 32 for heat treatment of pre-selected components in a manner similar to that for station 31. This repetitive process of movement between heat treatment stations and heat treatment of pre-selected workpiece components at each station is performed until the workpiece arrives at the final heat treatment station, which in the case of the embodiment shown in FIG. 1(*a*), is station 33. After heat treatment in station 33 the crane 40 raises and transfers the workpiece to an unload station (not shown in the drawings) where the crane 40 deposits the heat-treated workpiece. An artisan will appreciate that the crane and gantry can be alternatively configured without deviation from the invention. For example, multiple cranes 40 may be provided so that workpieces can be seated in multiple stations at the same time. The X-Z axes workpiece transport system is optimized for the layout of components of the heat treatment system shown in FIG. 1(*a*). The artisan will appreciate that variations in the workpiece transport system, including freestanding crane systems, can be used for other layouts of components.

In one embodiment of the invention, control components for the heat treatment system 10 are generally centralized in a control section 27. In a typical installation, control components will include one or more computer processing devices, such as programmable logic controllers, that interface with input and output devices for components of induction heat treatment system 10. In one embodiment, the controls include control means for the following: the power supplies, quenchant system, workpiece transport system, and workpiece positioning system. Control panel 28 provides input/output interface components between the control components and a human operator.

Figure 2C:
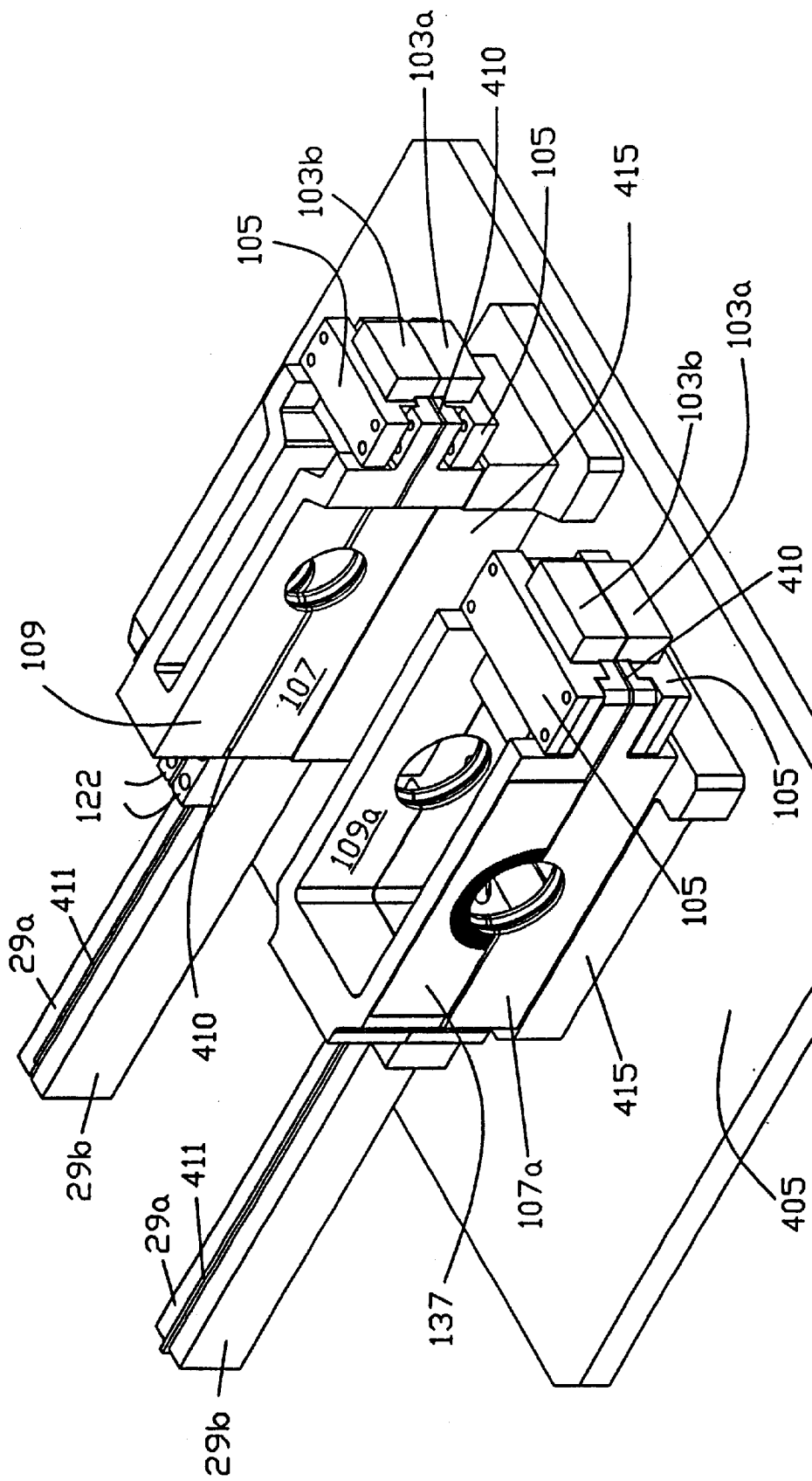
FIG. 2(c) is a perspective view of a partial pallet assembly for a heat treatment station showing one bottom and top inductor segment pair for heat treatment of workpiece components whose axes are parallel to and offset from a common workpiece axis, and one bottom and top inductor segment pair for heat treatment of workpiece components whose axes are common to the common workpiece axis, with both top inductor segments in the closed position.
Figure 2P:
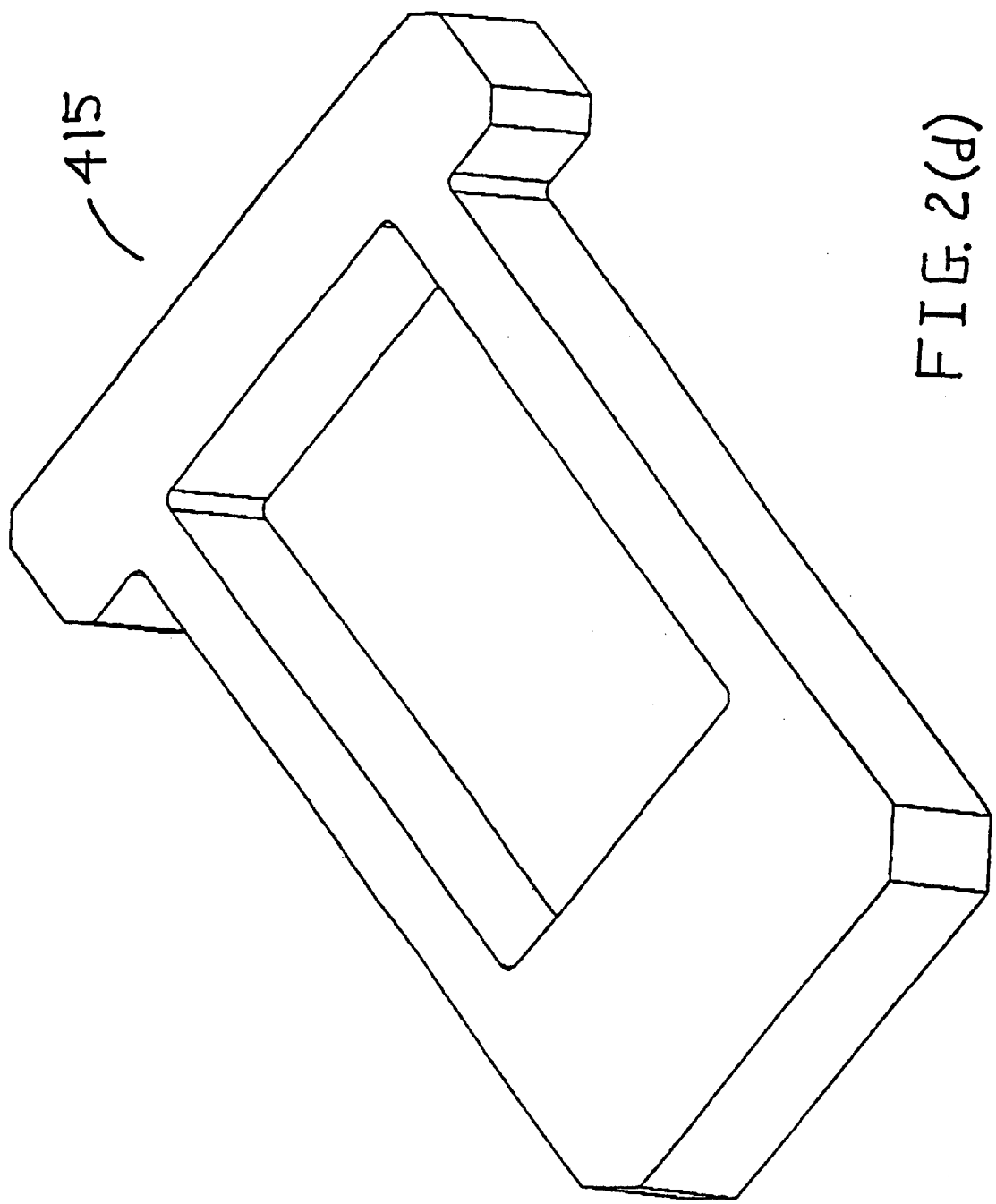
FIG. 2(a) is a perspective view of a typical first, or bottom, inductor segment of the present invention that is used to heat treat one or two workpiece components whose axes are parallel to and offset from a common workpiece axis.
FIG. 2(b) is a perspective view of a typical second, or top, inductor segment of the present invention that is used to heat treat one or two workpiece components whose axes are parallel to and offset from a common workpiece axis.
FIG. 2(d) is a typical spacer for an inductor segment.

Each heat treatment station, 31, 32 or 33, includes a heat treatment pallet assembly that is made up of a bottom and top pallet assemblies. Each bottom pallet assembly 400 includes one or more first (bottom) inductor segments as representatively shown by bottom inductor segments 107 and 107*a* in FIG. 9(*a*). Bottom inductor segment 107 is representative of a bottom inductor segment that can heat treat up to two workpiece components whose axes are parallel to and offset from the common workpiece axis. Bottom inductor segment 107*a* is representative of a bottom inductor segment that can heat treat up to two workpiece components whose axes are parallel to and coincident with the common workpiece axis. Each top pallet assembly 500 includes one or more second (top) inductor segments as representatively shown by top inductor segments 109 and 109*a* in FIG. 9(*a*). Top inductor segment 109 is representative of a top inductor segment that can heat treat up to two workpiece components whose axes are parallel to and offset from the common workpiece axis. Top inductor segment 109*a* is representative of a top inductor segment that can heat treat up to two workpiece components whose axes are parallel to and coincident with the common workpiece axis. Dielectric material 410 separates the opposing facing surfaces of the bottom and top inductor segments, as shown in FIG. 2(*c*). While air is not the preferred dielectric material, in alternative embodiments of the invention an air gap can serve as a sufficient dielectric. Dielectric material 410 can be applied to the facing surface of either a bottom or top inductor segment. While the orientation of bottom and top is used to refer to the components of a heat treatment station, the terms are not intended to be a limitation on the functional orientation of the first and second inductor assemblies. As further described below, when the pallet assembly 100 for the heat treatment station of FIG. 9(*a*) (shown in the opened position) is moved to the closed position, top inductor segments 109 and 109*a* mate with bottom inductor segments 107 and 107*a*, respectively, to form substantially closed inductors around pre-selected components of a workpiece. The closed position for top and bottom inductor pair of segments 107 and 109, and 107*a* and 109*a*, is shown in FIG. 2(*c*). The top and bottom inductor assemblies shown in the figures represent selected configurations of heat treatment stations that can heat a maximum of two workpiece components whose axes are parallel to and offset from the central workpiece axis, and two workpiece components whose axes are common with the workpiece axis. In alternative configurations, the substantially closed top and bottom inductor segments can heat treat a workpiece made up of any combination of workpiece components whose axes are parallel to and offset from the central workpiece axis, and whose axes are common to the workpiece axis, including a single, or odd number of workpiece components of either type. The number of workpiece heat treatment stations and configurations of the stations will depend upon the particular configuration of a workpiece. While a single coil turn is used for the top and bottom inductor segments shown in the drawings, the artisan will appreciate that two or more turns can be provided to harden relatively large individual workpiece components without deviating from the scope of the invention.

A bottom or top inductor segment can be fabricated from a solid copper block. An interior through opening is provided in each inductor segment. FIG. 2(a) and FIG. 2(b) show interior through openings 117a and 117b in bottom and top inductor segments, 107 and 109, respectively. Each through opening forms first and second coil segments that substantially surround a through opening. The through openings are also used for placing a flux concentrator segment around inductor segments as further described below. The first and second coil segments serve as supply and return current paths through a bottom inductor segment. In a top inductor segment, the first and second coil segments form a generally circular induced current path. When current in the bottom inductor segment is generally in the direction indicated by the arrows in FIG. 2(a), the induced current in the top inductor segment is generally in the opposite direction as indicated by the arrows in FIG. 2(b). Depending upon the workpiece component being heated at a particular heat treatment station, the through openings can also serve as the situs (residence) for a non-heat-treated workpiece component that joins the one or two workpiece components to be heat-treated in a pair of top and bottom inductor segments. Generally, the width of the through openings in the bottom and top inductor segments will be slightly larger than the width of the non-heat treated workpiece component. In the preferred embodiment of the invention, each of the first and second coil segments has one partial opening as illustrated by openings 121a and 121b in FIG. 2(a) and FIG. 2(b), respectively. The partial opening in a bottom inductor segment is positioned mirror image relative to its corresponding partial opening in the top inductor segment. For example, for the bottom inductor segment 107 shown in FIG. 2(a) workpiece partial opening 121a in the bottom inductor segment is positioned mirror image relative to workpiece opening 121b in the top inductor segment shown in FIG. 2(b). When a top pallet assembly is in the closed position, the one or more top inductor segments in the top pallet assembly have their facing surfaces positioned adjacent to (but electrically isolated from) the corresponding one or more bottom inductor segments in the bottom pallet assembly. One or more magnetic flux concentrator coupling regions are provided on corresponding top and bottom inductor segments as illustrated by magnetic flux concentrator coupling regions 119a and 119b in FIG. 2(a) and FIG. 2(b), respectively. Each bottom inductor segment has provisions for connecting to a power source as illustrated in FIG. 2(c) where two electrical connectors 29a and 29b are attached to bottom inductor segment 107 at power termination region 122. A dielectric material 411 electrically isolates the two conductors from each other. As previously disclosed the conductors 29a and 29b connect each bottom inductor segment to a power supply 20 via a load-matching transformer 22. In alternate configurations, the load-matching transformer is eliminated by including the function of the transformer in the power supply.

Figure 3A:
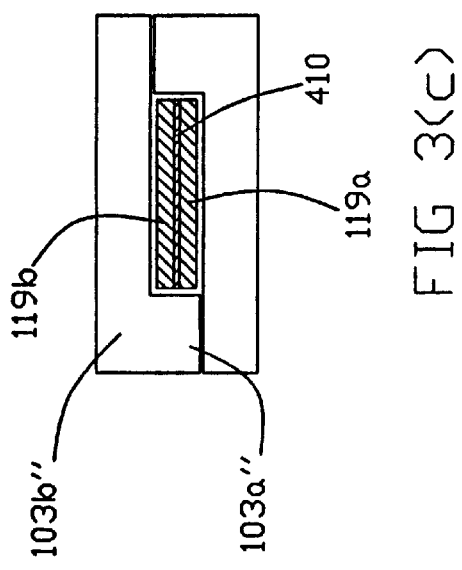
FIG. 3(a) is a perspective view of one embodiment of a flux concentrator for use with the heat treatment station of the present invention.

As illustrated in FIG. 2(c) and FIG. 3(a), magnetic flux concentrator segments 103a and 103b form a magnetic flux concentrator that couples magnetic flux from a powered bottom inductor segment to a top inductor segment when the top pallet assembly is in the closed position and power is applied to the one or more bottom inductor segments. Each flux concentrator is held in place around its associated inductor segment by retainers 105. Each concentrator segment comprises a high permeability magnetic material such as a plurality of laminated steel sheets. When the top pallet assembly is in the closed position, surfaces 104a and 106a of concentrator segment 103a are brought close to or in contact with opposing surfaces 104b and 106b, respectively, of concentrator segment 103b. Ideally, opposing flux concentrator surfaces should touch each other for maximum magnetic flux coupling when the top pallet assembly is in the closed position. However, in the preferred embodiment, a minimal air gap is maintained to account for mechanical tolerances that could cause opposing facing surfaces to strike each other when the top pallet assembly 500 is moved to the closed position.

Figure 3B:
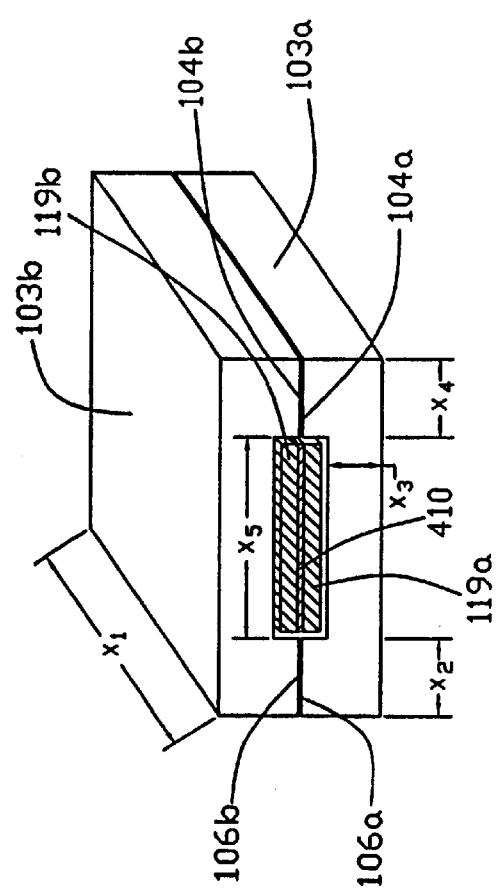
FIG. 3(b) is a side elevational view of one embodiment of a flux concentrator for use with the heat treatment station of the present invention.
Figure 3C:
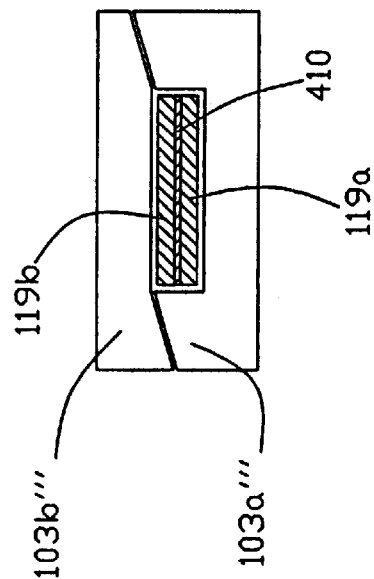
FIG. 3(c) is a side elevational view of another embodiment of a flux concentrator for use with the heat treatment station of the present invention.
Figure 3D:
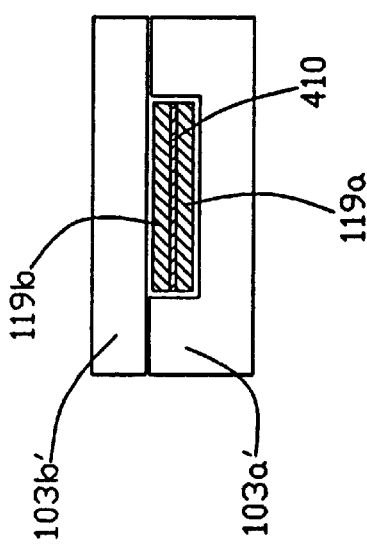
FIG. 3(d) is a side elevational view of another embodiment of a flux concentrator for use with the heat treatment station of the present invention.

Although a single pair of U-shaped flux concentrators is shown around a pair of bottom and top inductor segments in FIG. 2(c), multiple pairs of flux concentrators may be similarly disposed around multiple corresponding flux concentrator regions of the bottom and top inductor segments to enhance magnetic flux coupling. Alternative configurations for magnetic flux concentrator segment pairs are shown in FIG. 3(b) through FIG. 3(d). The configuration shown in FIG. 3(b) is particularly useful in that the weight of the concentrator segment 103b' associated with the top inductor segment is minimized, which helps minimize the weight of the moveable top pallet assembly.

The partial openings in the coil segments are generally semi-circular in shape with optional profiling modifications as disclosed below. When a top inductor segment is properly aligned on top of a bottom inductor segment (with dielectric separation), corresponding partial openings form a complete inductor coil opening that substantially surrounds the preselected workpiece component to be heat treated when it is properly seated in a station and power is applied to the bottom inductor coil. When the top and bottom inductor segments are used to heat treat substantially cylindrical workpiece components that are non-concentric with the main axis of the workpiece, the axes of the partial openings are offset from the main axis of the workpiece as representatively shown in FIG. 2(a) and FIG. 2(b). When the substantially cylindrical workpiece components have axes common with the central axis of the workpiece, the partial openings are coaxial with the main axis of the workpiece. The widths and diameters of the partial openings and through openings will depend upon the widths and diameters of the workpiece components of a specific workpiece. Furthermore, the diameters of the partial openings are selected to satisfy a number of requirements, including a suitable air gap between their surfaces and a workpiece component seated in the openings; sufficient quench flow in the air gap; and thermal expansion of workpiece components during heat treatment. Each partial opening forms a generally arcuate coil surface. Particularly when quenching is provided, the generally arcuate coil surface of an inductor segment is separated by a quench orifice. In this embodiment, the quench orifice will separate the generally arcuate coil surface into inner and outer coil "lips" as representatively shown in FIG. 2(a) for bottom inductor segment 107 with quench orifice 131 and outer and inner coil lips 123a and 123b, respectively. In alternative embodiments the orifice 131 does not need to be a singular opening. For example a plurality of discrete perforations generally in the region occupied by orifice 131 can also be used. A fishtail interface region is defined by the interface of the formed coil lips with their associated coil-facing surface as representatively shown in FIG. 2(*a*) for coil interface regions 127 formed by coil lips 123*a* and 123*b* at their coil-facing surface 115*a*. The region of a coil lip pair at the deepest penetration into the top or bottom inductor assembly (in other words, approximately 90 degrees offset from the interface regions) is referred to as the base region and is representatively shown by element 129 for one opening of bottom inductor segment 107. Coil lips generally have an axial width (i.e., width of a coil lip in the axial direction of a workpiece component sited within the partial opening formed by the arcuate surface with coil lips) in the interface regions 127 that is larger than their axial width near the base area 129. While this can be accomplished by skewing the walls of the lips, the walls may also be beveled as representatively shown in FIG. 2(*a*) to accomplish the narrowing effect.

In an alternative embodiment, the partial openings in a pair of associated bottom and top inductor segments, 107*b* and 109*b*, respectively, form a substantially ovoid opening as shown in FIG. 8(*a*). With this configuration the smallest radial air gap will be in the interface regions 127 and the largest air gap will be in the region where there is a lack of adjacent masses in workpiece components adjoining the workpiece component being heat treated and/or in the region of a hole in the heat treated workpiece component, as representatively shown by air gap region 128 in FIG. 8(*a*). For this configuration, the base region 129*b* for bottom inductor segment 107*b* will have an air gap smaller than the largest air gap but larger than the smallest air gaps. This configuration is particularly useful for compensating for the non-symmetrical shape of a non-heat-treated workpiece component sited in through openings adjacent to the workpiece component being heat-treated or when the workpiece component being heat-treated has an opening, such as a hole, or other void within it.

In an alternative embodiment the bottom powered (or active) partial inductor can consist of a single turn coil as shown in FIG. 2(*a*) while the top (or passive) partial inductor consists of a double turn coil. A double turn coil is similar to two single turn coils shown in FIG. 2(*b*) with one of the single turn coils placed inside of the other single turn coil (in its through opening). A pair of magnetic flux concentrators can be used to magnetically couple the active partial inductor to the two single turn coils that make up the passive partial inductor. In this configuration the two single turn coils are electrically isolated from each other as well as from the active partial inductor. A pair of passive partial workpiece openings formed in adjoining coil segments of the two passive partial inductors will be opposed in combination by a single partial workpiece opening in the active partial inductor. Each of the pair of passive partial workpiece openings can be profiled with a pair of coil lips as set forth above or alternatively profiled so that the combined pair of passive partial workpiece openings form a single pair of coil lips. In this second configuration, the orifice separating the coil lips is formed from the separation between the electrically isolated adjoining coil segments.

Each quench orifice 131, is connected to one or more quenchant passages 133 through the top and bottom inductor segments. The quenchant passages exit in one or more quenchant inlet openings 135 provided in the bottom and top inductor segments. In alternative embodiments of the invention, quenchant passages and routing may be via tubing or piping external to the inductor segments.

One or more slotted side shields as representatively shown in FIG. 5(*a*) through FIG. 5(*d*); FIG. 6(*b*) and 6(*c*); and FIG. 7(*b*) and 7(*c*) are optionally provided on one or both sides of an inductor segment around the arcuate coil region of an inductor segment. FIG. 2(*c*) illustrates the general application of an outer side shield 137 to top inductor segment 109*a*. A side shield serves as both a magnetic flux concentrator (for the workpiece component being heat-treated) and a magnetic field shield (for workpiece components adjoining the heat-treated component). A side shield is formed from a suitable high permeability magnetic material such as a magnetic steel. The side shield affects the shape of the magnetic field created by current flow in the inductor segment that it is attached to, which will affect the hardening of selected regions in the workpiece component being heat treated. Additionally, a side shield also protects the workpiece component not being heat treated in the inductor assembly (situated in through openings 117*a* and 117*b* or externally adjacent to an inductor segment) from undesirable stray heating. FIG. 5(*a*) and FIG. 5(*b*) further illustrate the preferred embodiment of a side shield. The pitch ratio between a slot 136 and adjacent tooth 139 for a side shield can be controlled to affect the degree of shielding provided by the side shield. If the ratio of the slot width ($w_1$) to adjacent tooth width ($w_2$) is greater than 5, the effectiveness of the side shield as a magnetic flux concentrator and magnetic field shield will be diminished. Consequently, minimum concentration and shielding will be provided with a ratio greater than 5. Conversely, as the pitch ratio is made smaller, magnetic concentration and shielding improves. FIG. 5(*c*) and FIG. 5(*d*) illustrate typical outer 137*a* and inner 137*b* laminated side shields that would improve heat treatment of a workpiece component with an opening or void areas in the region adjacent to large slots 138*a* and 138*b*. Their placement relative to coil segments is representatively shown in FIG. 4(*e*) and FIG. 4(*f*). Providing the large (elongated) slots adjacent to the opening decreases heating around the opening and decreases the probability of cracking in the region of the opening and hole areas due to overheating and heat stress. Generally the width of the elongated slot is limited to less than three times the diameter of the adjacent opening. Additionally the shields may be individually profiled in shape to accommodate a desired field configuration around a particular workpiece component to be heat treated. A shield's thickness is critical for performance. For practical applications, a thickness of each individual side shield should generally not be greater then 3 mm. Otherwise, the side shield will be heated during heat treatment of a workpiece, which is an undesirable phenomenon. In some applications, the surface of a side shield facing away from an inductor segment may make contact with an adjoining workpiece component to form a path for an electrical short circuit. In cases like this, the side shield should be electrically isolated from the inductor with a dielectric material or seated flush within the bounding surface of the inductor segment.

Figure 4A:
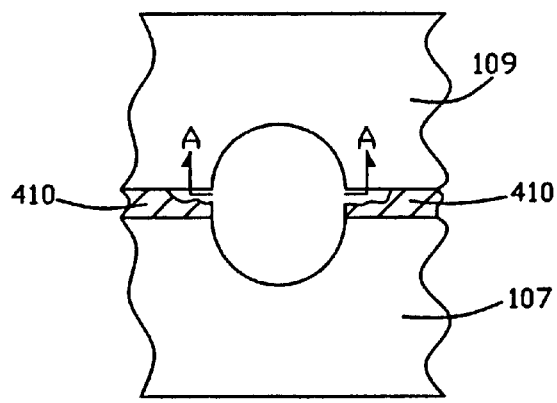
FIG. 4(a) is a partial cross sectional side view of the first and second partial workpiece openings of the coil segments for a pair of bottom and top inductor segments.
Figure 4B:
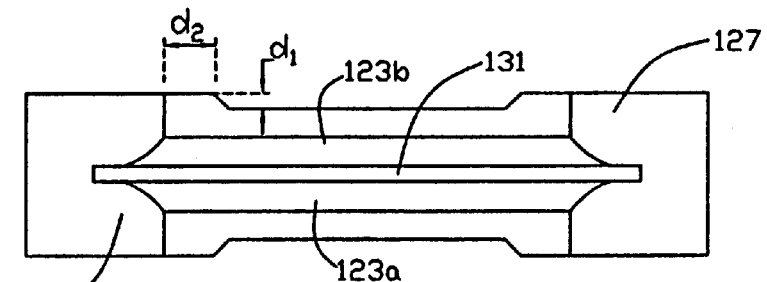
FIG. 4(b) is a partial cross sectional view of an arcuate coil surface and interface region as indicated by section line A—A in FIG. 4(a).
Figure 4C:
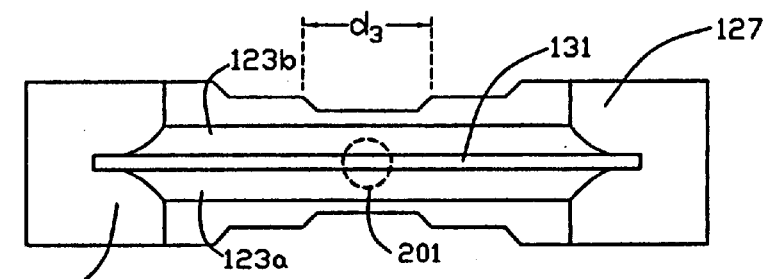
FIG. 4(c) is a partial cross sectional view of an arcuate coil surface and interface region as indicated by section line A—A in FIG. 4(a) illustrating coil profiling for heat treatment of a workpiece component having a hole.
Figure 4D:
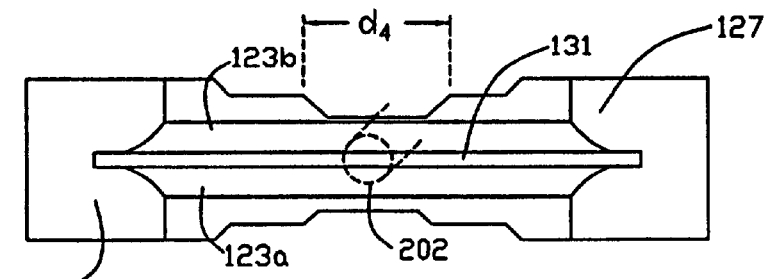
FIG. 4(d) is a partial cross sectional view of an arcuate coil surface and interface region as indicated by section line A—A in FIG. 4(a) illustrating coil profiling for heat treatment of a workpiece component having a hole that is axially skewed.
Figure 4E:
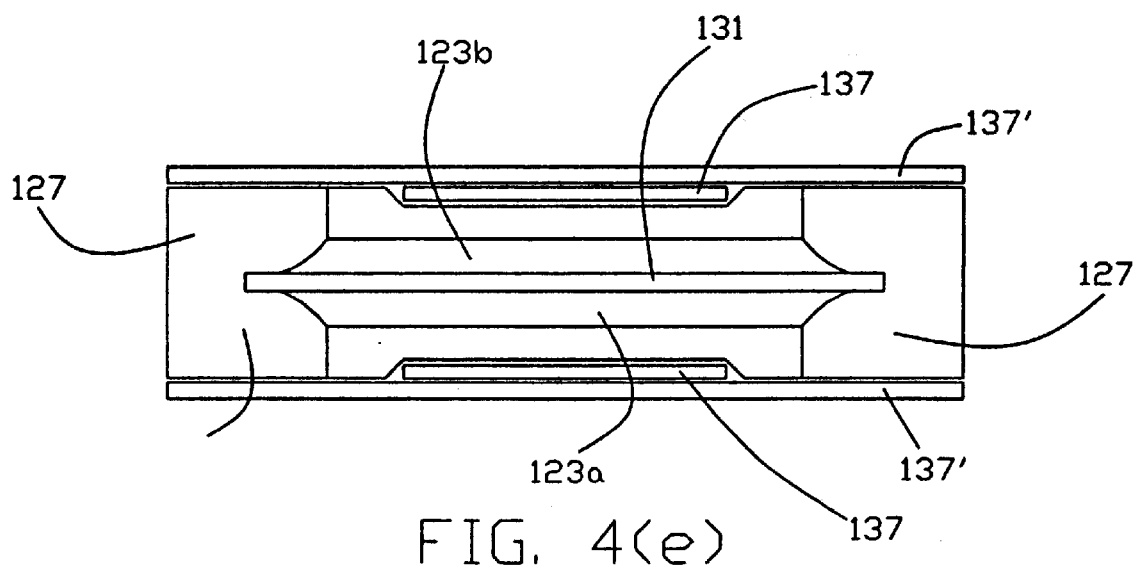
FIG. 4(e) is a partial cross sectional view of an arcuate coil surface and interface region as indicated by section line A—A in FIG. 4(a) illustrating the use of inner and outer side shields to compensate for voids or varying masses in workpiece components adjoining the workpiece component to be heat treated.
Figure 4F:
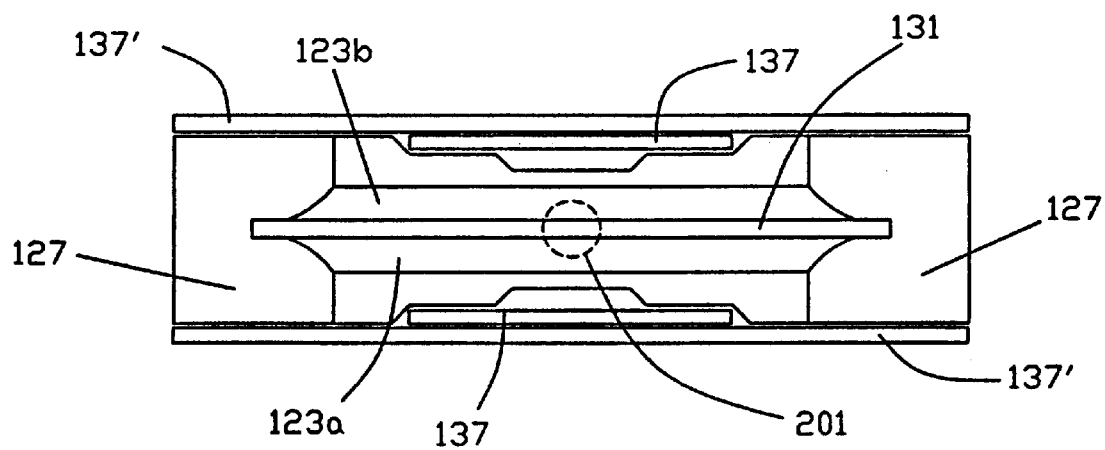
FIG. 4(f) is a partial cross sectional view of an arcuate coil surface and interface region as indicated by section line A—A in FIG. 4(a) illustrating the use of inner and outer side shields to compensate for a hole or other void in the workpiece component to be heat treated.
Figure 5A:
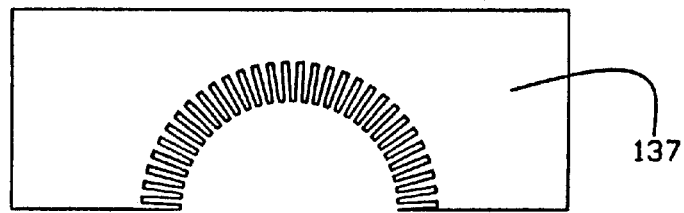
FIG. 5(a) is a side view of a side shield for use with a coil segment of the present invention.
Figure 5B:
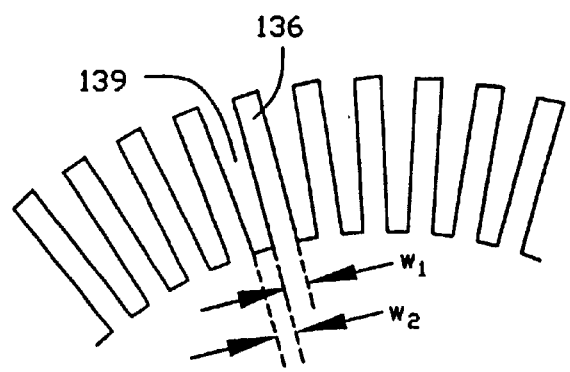
FIG. 5(b) is a side view detail, on an enlarged scale, of a side shield for use with a coil segment of the present invention.
Figure 5C:
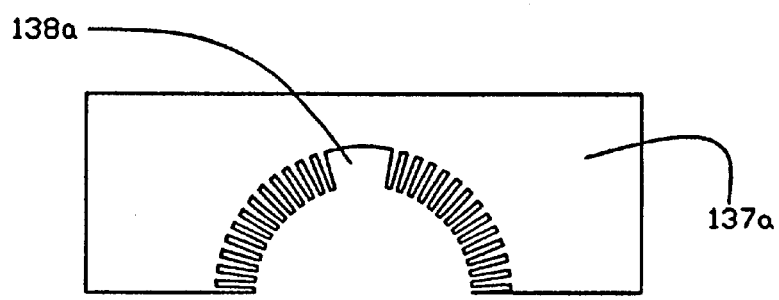
FIG. 5(c) is a side view of an outer side shield for use with a coil segment of the present invention that is used to heat-treat a workpiece component having a hole.
Figure 5D:
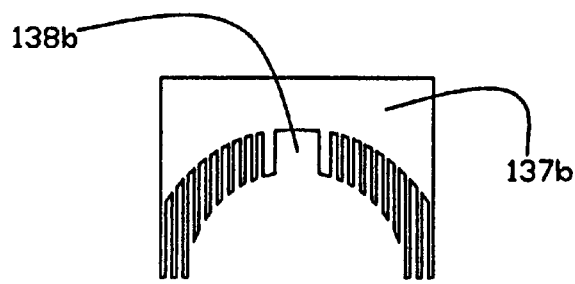
FIG. 5(d) is a side view of an inner side shield for use with a coil segment of the present invention that is used to heat-treat a workpiece component having a hole.
Figure 6A:
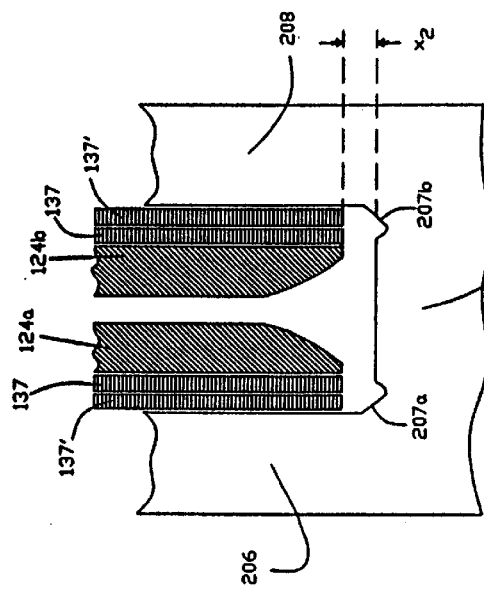
FIG. 6(a) is a partial cross sectional view of a workpiece component sited in the first and second partial workpiece openings of the coil segments for a pair of bottom and top inductor segments.

In order to achieve optimum heat treatment of specific workpiece components in the induction heat treatment system 10, individual coil segments (or coil lips) can be "profiled" by varying the width of inductor segment regions in the axial direction of the workpiece component to accommodate various workpiece hardening requirements. Profiling corrects for anomalies in induction heating due to the dielectric separation between corresponding bottom and top inductor segments, the varying irregular shape of non-heat-treated workpiece components joining heat-treated workpiece components and irregularities in the heat-treated components, such as openings, oil holes and other voids, that can affect the magnetic field and current distribution in the workpiece. In most general terms, profiling is the inclusion of a feature in an inductor segment (or coil lip) that alters the partial opening from a generally smooth semicircular arcuate coil surface. FIG. 4(b) illustrates a general profiling approach for a coil segment. Generally, the circumferential length, $d_2$, adjacent to the interface region 127 is less than 2 times the axial width of the workpiece component to be heat treated within the coil segment, and the axial transition width of the coil segment, $d_1$, is selected to be less than 0.3 times the axial width of the same workpiece component. Making the coil the widest in the interface region 127 compensates for the dielectric separation between the facing surfaces of the bottom and top inductor segments. As shown in FIG. 4(c), in the region near an opening 201 (projected in phantom onto the arcuate surface of the coil segment) in the surface of the workpiece component being heat treated, the inner and outer faces of the coil segment adjacent to the opening are further profiled to compensate for the opening in the surface of the workpiece component. Generally the axial width of the profile cut, $(d_3)$, is less than 3 times the outside diameter of the opening 201. In the case of a skewed or angled hole 202 (projected in phantom onto the arcuate surface of the coil segment), the profiling width $(d_4)$ is increased on the side closer to the skewed opening as shown in FIG. 4(d). In some cases, the effect of dielectric separation between the facing surfaces of the bottom and top inductor segments can be compensated for by the combination of a widened coil and smaller "coil-to-workpiece" air gap in the region of the facing surfaces as illustrated in FIG. 6(a). FIG. 4(e) and FIG. 4(f) illustrate the application of double or "sandwich" side shields on each side of an inductor segment in addition to the profiling features of FIG. 4(b) and FIG. 4(c), respectively.

Figure 6C:
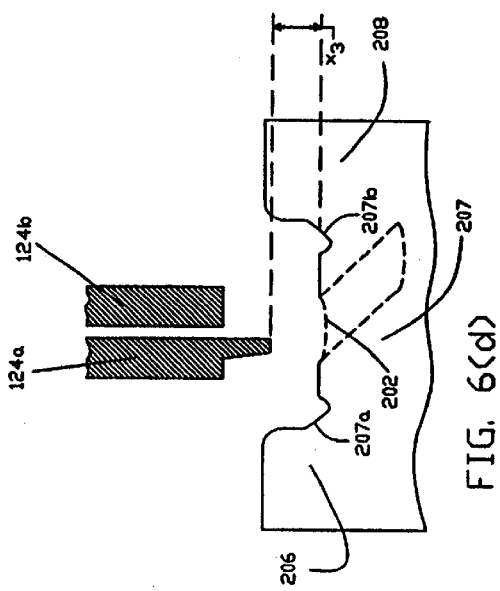
FIG. 6(c) is a partial cross sectional view of a workpiece component sited in a partial workpiece opening along with its adjoining components and inductor coil with multiple side shields, as indicated by section line B—B in FIG. 6(a), for heat treating only the surface of the work-piece component.
Figure 6B:
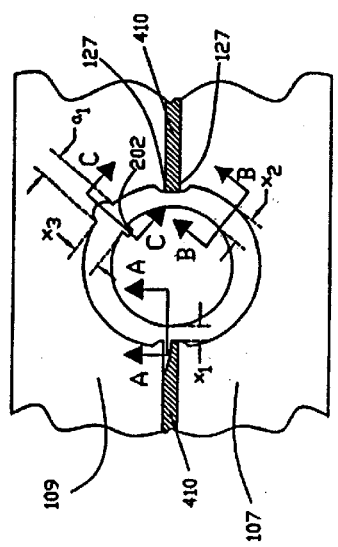
FIG. 6(b) is a partial cross sectional view of a workpiece component sited in a partial workpiece opening along with its adjoining components and inductor coil with side shields, as indicated by section line A—A in FIG. 6(a), for heat treating only the surface of the workpiece component.
Figure 6D:
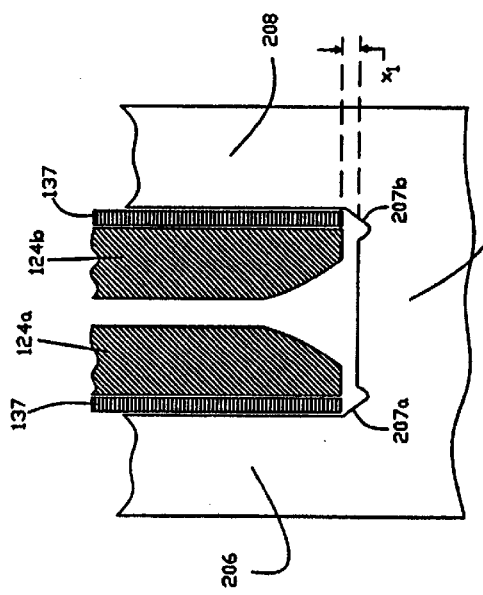
FIG. 6(d) is a partial cross sectional view of a workpiece component sited in a partial workpiece opening along with its adjoining components and inductor coil shaped to heat treat a workpiece component having a hole, or voids resulting from small adjoining components, or both, as indicated by section line C—C in FIG. 6(a), while heat treating only the surface of the workpiece component.
Figure 8A:
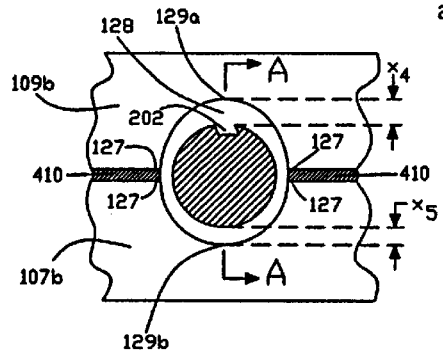
FIG. 8(a) is a partial cross sectional view of a workpiece component sited in the first and second partial workpiece openings of the coil segments for a pair of bottom and top inductor segments wherein the first and second partial workpiece openings form an ovoid shape.
Figure 8C:
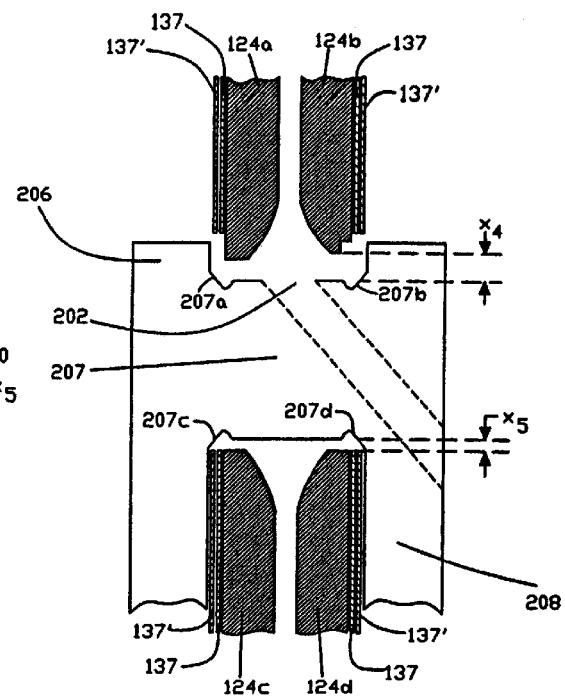
FIG. 8(c) is a partial cross sectional view of a workpiece component sited in a pair of partial workpiece openings along with its adjoining components and inductor coils with side shields positioned below (receding from) the edges of the arcuate coil surfaces that are profiled to accommodate a hole in the workpiece component as indicated by section line A—A in FIG. 8(a).
Figure 8B:
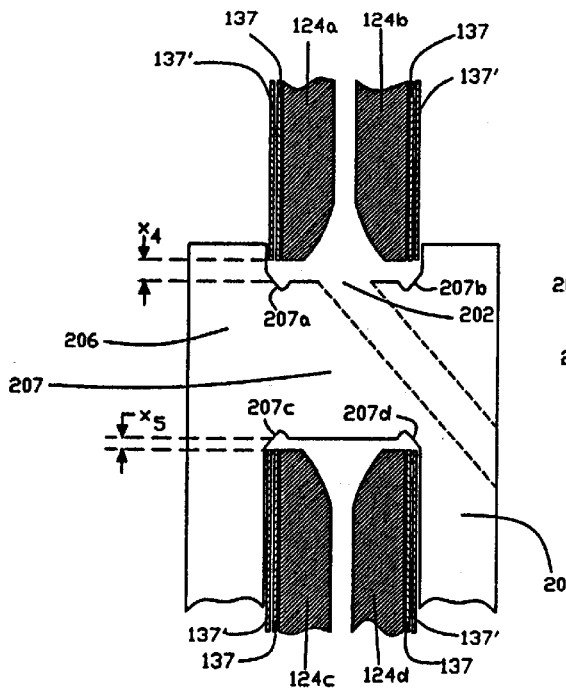
FIG. 8(b) is a partial cross sectional view of a workpiece component sited in a pair of partial workpiece openings along with its adjoining components and inductor coils with side shields positioned flush with the edges of the arcuate coil surfaces as indicated by section line A—A in FIG. 8(a).
Figure 8D:
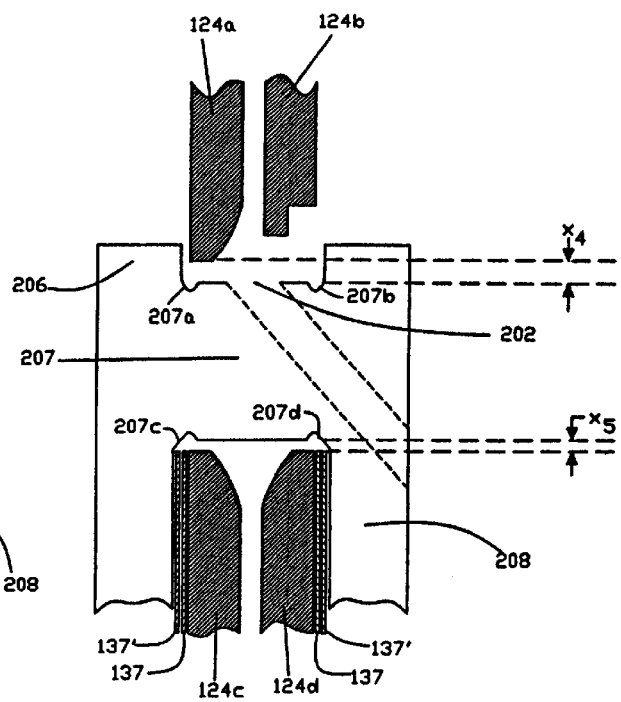
FIG. 8(d) is a partial cross sectional view of a workpiece component sited in a pair of partial workpiece openings along with its adjoining components and inductor coils profiled to accommodate a hole, or voids resulting from small adjoining components, or both, as indicated by section line A—A in FIG. 8(a).

As best shown in FIG. 6(d) and 7(c), the radius of the arcuate coil region can be varied based upon the requirements of a specific workpiece to be heat-treated. Making this modification will vary the radial length of the air gap between the surface of the workpiece component and the arcuate inductor surface. Generally, a smaller air gap is maintained in the interface areas 127 to compensate for the dielectric gap created between opposing surfaces of the top and bottom inductor coil segments.

In some applications, it is preferred to limit heat treatment to the surface area of a pre-selected workpiece component. In alternative applications, heat treatment of the surface area of the workpiece component and its fillet areas is preferred.

FIG. 6(b) through FIG. 6(d) illustrate typical applications of side shields and coil profiling to achieve a desired workpiece surface hardening without fillet hardening. With reference to the section line A—A in FIG. 6(a), FIG. 6(b) illustrates the use of inner and outer side shields (referred to as a "sandwich-type" side shield) that have one of their edges flush with the edges of the lips 124a and 124b of an inductor segment to achieve workpiece component 207 surface hardening without hardening the fillet areas 207a and 207b bounding adjoining workpiece components 206 and 208, respectively. FIG. 6(c) (referenced to section line B—B in FIG. 6(a)) illustrates a variation where two side shields, 137 and 137', are used in a sandwich configuration to provide finer magnetic field control in the coil segment. FIG. 4(e) and FIG. 4(f) also illustrate applications of side shields in a sandwich configuration. This results in better harden pattern repeatability. In addition, it allows improving the shielding characteristics of side shields and significantly reduces the coil segment's sensibility to irregularly shaped adjacent workpiece components 206 and 208. In alternative embodiments, more than two side shields can be provided in a sandwich configuration for more precise field control. FIG. 6(d) illustrates a heat treatment application without side shields when the pre-selected workpiece component 207 to be hardened has a hole 202 or other opening and/or the adjoining workpiece components 206 and 207 have adjacent voids or lack of mass. As shown in FIG. 6(a) inductor segment 109 has been recessively profiled in the radial direction at section line C—C to modify the field of the coil in vicinity of opening 202. When the inductor segment is radially profiled as indicated by section line C—C in FIG. 6(a) the preferred width, $a_1$, of the radially profiled cut, is less than three times the inside diameter of the adjacent hole.

Alternatively FIG. 7(a) through FIG. 7(c) illustrate alternative arrangements where the fillet areas 207a and 207b as well as the surface of the pre-selected workpiece component 207 are heat-treated. FIG. 6(d), FIG. 7(c), and FIG. 8(b) through FIG. 8(d) show radial coil profiling where there is an angled oil hole 202 in the workpiece component 207 being heat-treated.

Figure 9A:
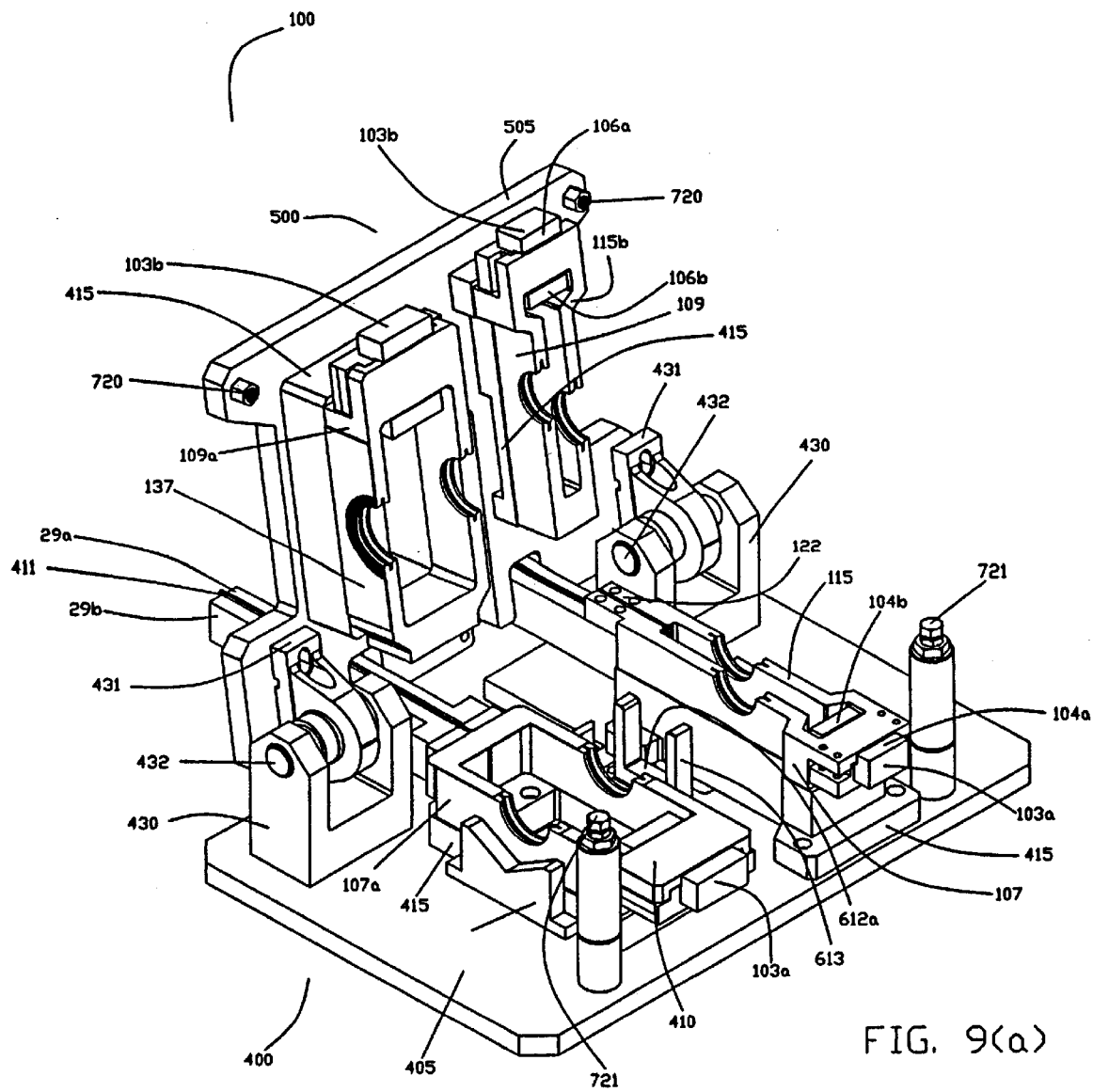
FIG. 9(a) is a perspective view of a typical heat treatment station's pallet assembly in the opened position without a workpiece sited in the bottom pallet assembly.

A heat treatment station's bottom pallet assembly includes a base plate to which one or more bottom inductor segments are connected. FIG. 9(a) shows a representative bottom pallet assembly 400 having a base plate 405. Bottom inductor segments 107 and 107a are connected to base plate 405. Generally, a spacer 415, representatively shown in FIG. 2(d), is used to provide electrical isolation between each bottom inductor segment and the base plate. The spacers also function as height adjusters for the bottom inductor segments to accommodate proper seating of the workpiece in the bottom pallet assembly. Spacers can be fabricated from a suitable insulating material such as a NEMA Grade G-10 epoxy/glass material or a nylon/KEVLAR composite material or other similar types of material. If quenchant is required for heat treatment of workpiece components in the station, spacers 415 and bottom plate 405 can be provided with one or more passages to facilitate the supply of quenchant to the passages in the bottom inductor segments. Additionally, providing an opening in the interior of spacers 415 allows released quenchant to drain into the quenchant contaminant reservoir tank 50. Shaft support blocks 430 are attached to base plate 405.

If quenching is performed at a heat treatment station, the released quenchant is usually sufficient to cool the top and bottom inductor segments. However, if quenching is not performed at the station, or additional cooling of top and bottom inductor segments is desired, copper tubing can be soldered to the inductor segments to provide improved heat transfer from the inductor segments to a cooling medium flowing through the copper tubing.

Depending upon application features and workpiece geometry, one or more compensators can be incorporated into an induction heat treatment coil design. Compensators should be made from electrically conductive material, including, but not limited to, iron, carbon steel and stainless steel. Compensators can be attached to a coil segment. Alternatively, by using a special fixture, compensators can be located in voids adjacent to an inductor segment created by adjoining nonsymmetrical workpiece components (or the absence of the same). A compensator compensates for the lack of mass of metal in adjacent areas to an induction coil segment due to oddly shaped adjoining workpiece components. A compensator also redistributes the magnetic field in selected regions of the heat-treated workpiece component, for example, to compensate for surplus of power density in the areas where there is a lack of adjacent masses (i.e., due to adjoining workpiece component geometry). Similar to side shields and depending upon the application and workpiece geometry, compensators might have some "open" or void areas. For example, in the case of angled holes, a compensator located on the "non-massive" side of the angled hole might not have any "open" areas. At the same time, a compensator located on the "massive" side might have "open" areas.

A heat treatment station's top pallet assembly includes a back plate to which one or more top inductor segments are connected. FIG. 9(a) shows a representative top pallet assembly 500 with top inductor segments 109 and 109a connected to back plate 505. The top inductor segments are positioned on the back plate so that when the top pallet assembly is in the closed position the facing surfaces and partial workpiece openings on each top inductor segment are aligned with the facing surfaces and partial workpiece openings on each corresponding bottom inductor segment. Since in the illustrated embodiment the top pallet assembly is rotated between an opened and closed position, a rigid and lightweight metal, such as aluminum, is a suitable material for the back plate. Generally, as with the bottom pallet assembly, a spacer 415 is provided between the back plate 505 and each top inductor segment. Pillow blocks 431 are attached to back plate 505. The top pallet assembly 500 is rotatably connected to bottom pallet assembly 400 by shafts 432 so that the top pallet assembly can be moved away from the bottom pallet assembly to an opened position when the workpiece positioning system either removes or inserts a workpiece from the bottom pallet assembly. After a workpiece is inserted into the bottom pallet assembly, the top pallet assembly 500 is rotated to the closed position so that the workpiece components sited in the substantially cylindrical openings formed by the corresponding pair of workpiece partial openings can be heat treated by applying power to the bottom inductor segments and quenched, if desired. The artisan will appreciate that other means for selectively moving the top pallet assembly away from and towards the bottom pallet assembly can be used without deviating from the scope of the invention. For example, the top pallet assembly may be raised directly in the vertical direction if a lateral type of conveyor system is used to translate workpieces between stations. In another alternative configuration, the bottom (or first) and top (or second) pallet assemblies can be rotated 90 degrees so that the second pallet assembly could simply slide between the opened or closed positions. This particular arrangement permits the workpiece to be seated on components that are not attached to the first pallet assembly.

Figure 10A:
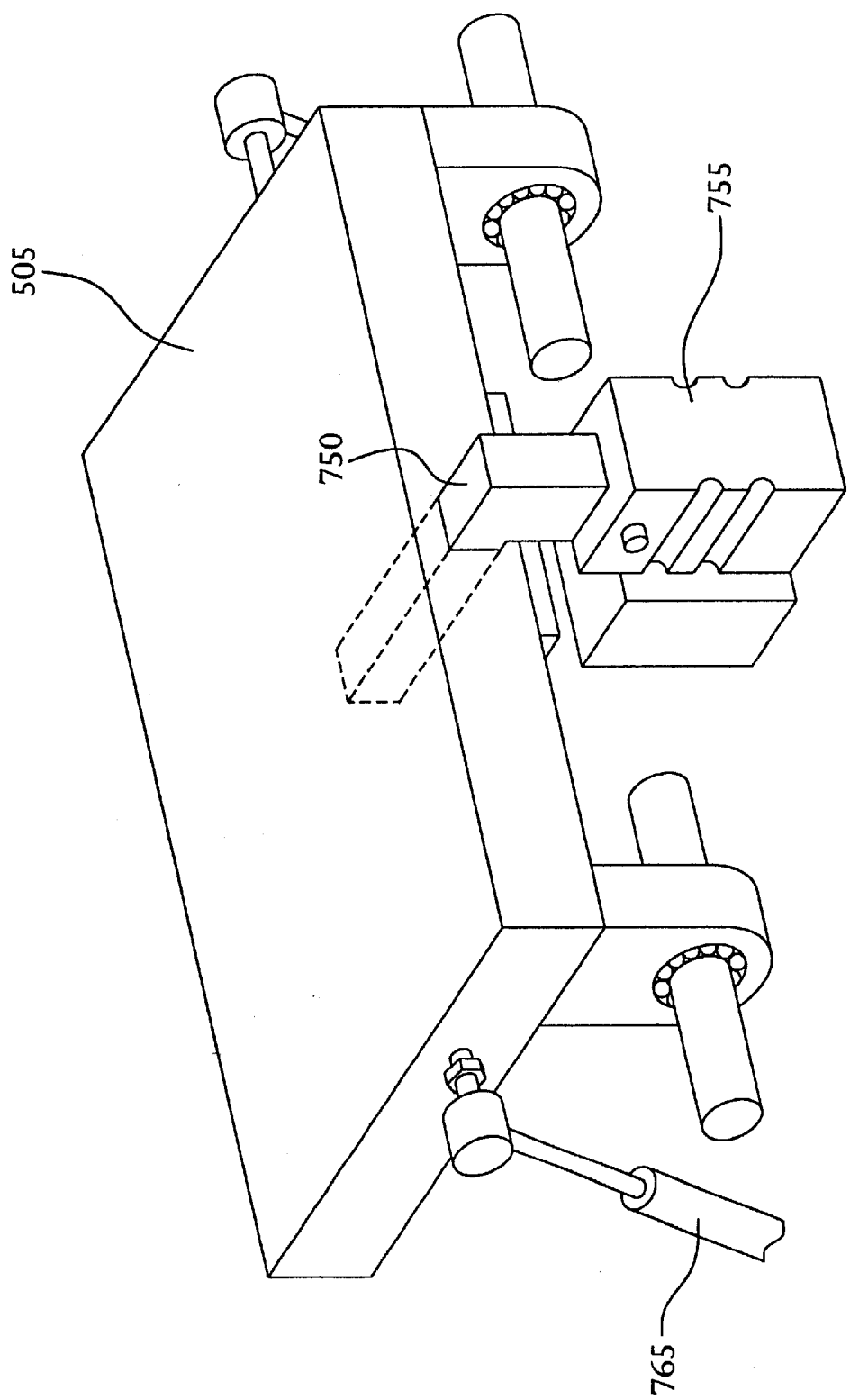
FIG. 10(a) is a perspective top view of a top pallet assembly for the heat treatment system of the present invention illustrating one embodiment of raising and lowering the top pallet assembly.

As shown in FIG. 10(a), pivoting lever 750 extends into a slot in back plate 505. If the top pallet assembly is in the closed position, rotational drive 755 can rotate lever 750, and the top pallet assembly into which it is inserted, in the direction indicated by the arrow to raise the top pallet assembly and attached components to the opened position. When the top pallet assembly is in the opened position, rotational drive 755 can rotate lever 750 and the top pallet assembly in the direction opposite from that indicated by the arrow to lower the top pallet assembly to the closed position. Rotational drive 755 is fixed to the structural foundation of the heat treatment station and can be a cam roller powered by compressed air or hydraulic toggle clamp. The pivoting clamp lever and the pivoting coil assembly are coaxial. The top pallet assembly can be counterbalanced either mechanically with weights or by using an optional damping device. As shown in FIG. 10(a), the damping function can be provided by a pneumatically driven spring actuator 765 that drives the top pallet assembly 500 to the opened position in the event that the hydraulic system fails. One end of the actuator 765 is connected to the top pallet assembly 500 while the opposing end can be attached to the base plate 405.

Figure 10B:
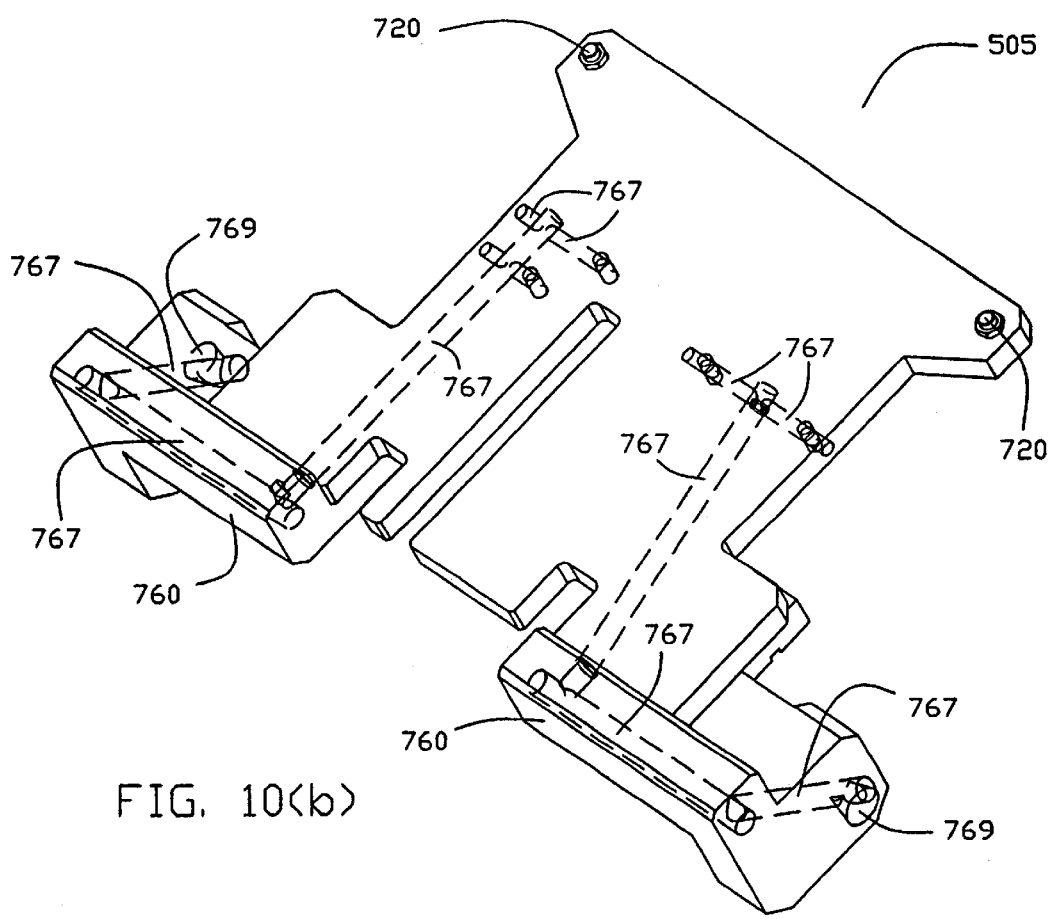
FIG. 10(b) is a perspective view of a back plate for a top pallet assembly illustrating the use of counterweights and quenchant fluid passages.

Back plate 505a shown in FIG. 10(b) includes counterweights 760. Also illustrated in FIG. 10(b) is the use of internal passages 767 (shown in dashed lines) to provide a quenchant path to the top inductor segments connected to the back plate. A quenchant inlet 769 provided in each counterweight 760 permits entry of quenchant into the internal passages. Each inlet can be connected to a quenchant supply with a rotary union and a quick connect coupling.

As rotational drive 755 pivots a top pallet assembly towards the closed position, one or more locator jig feet 720 in the top pallet assembly seat on corresponding locators 721 on the bottom pallet assembly to ensure proper alignment of the top and bottom inductor segments. Locators 721 can be provided with an adjustable height means to permit fine adjustment of the seating of the top inductor facing surfaces on the bottom inductor facing surfaces (with separation of a dielectric). Lateral adjustment of the top inductor segments relative to the bottom inductor segments can be accomplished by providing two concentric adjustable threaded collars on one side of each pillow block 431 attached to the top pallet assembly.

Figure 11:
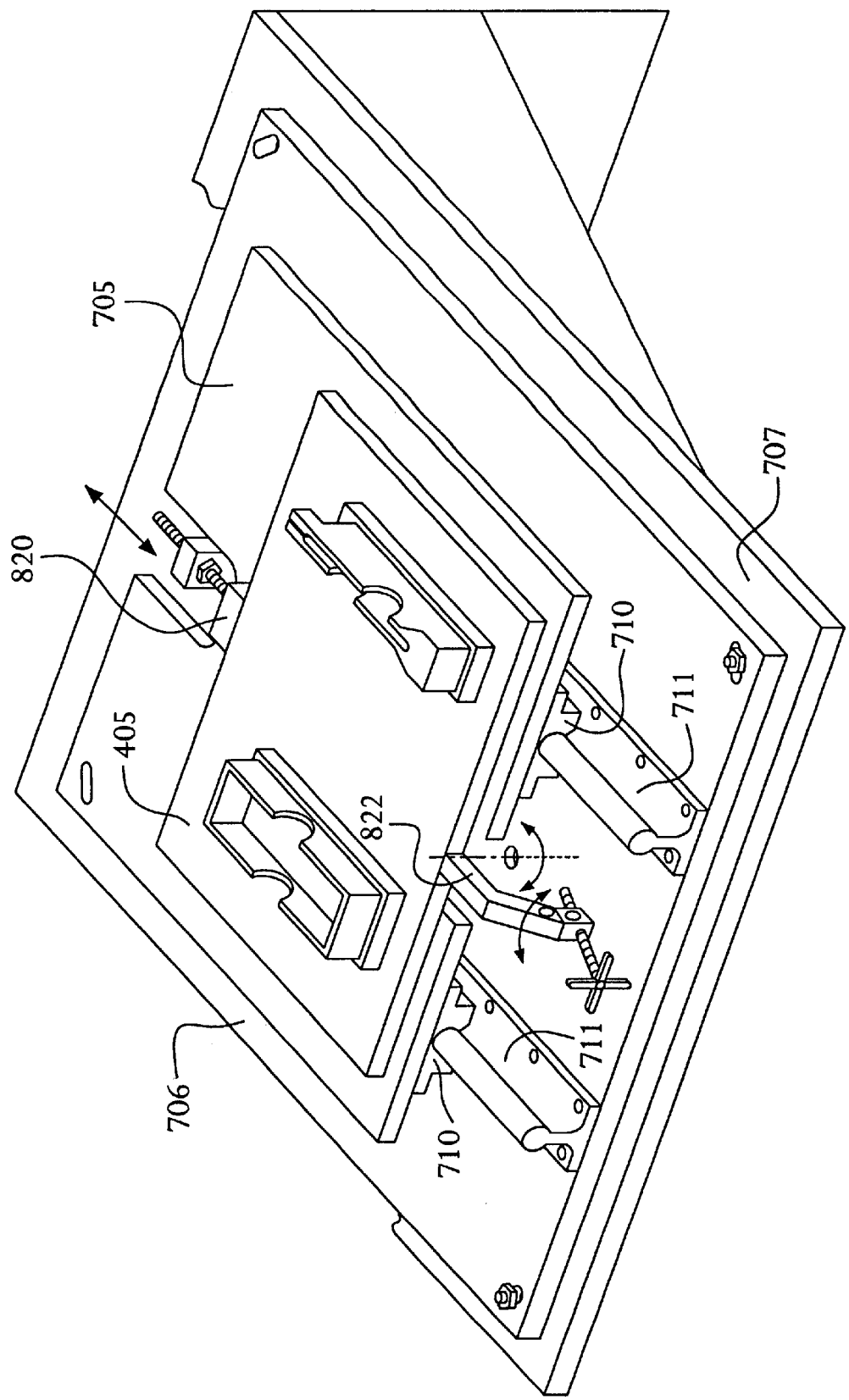
FIG. 11 is a perspective view of one embodiment of mounting elements for a bottom and top pallet assembly in a station of the heat treatment system of the present invention.
Figure 13:
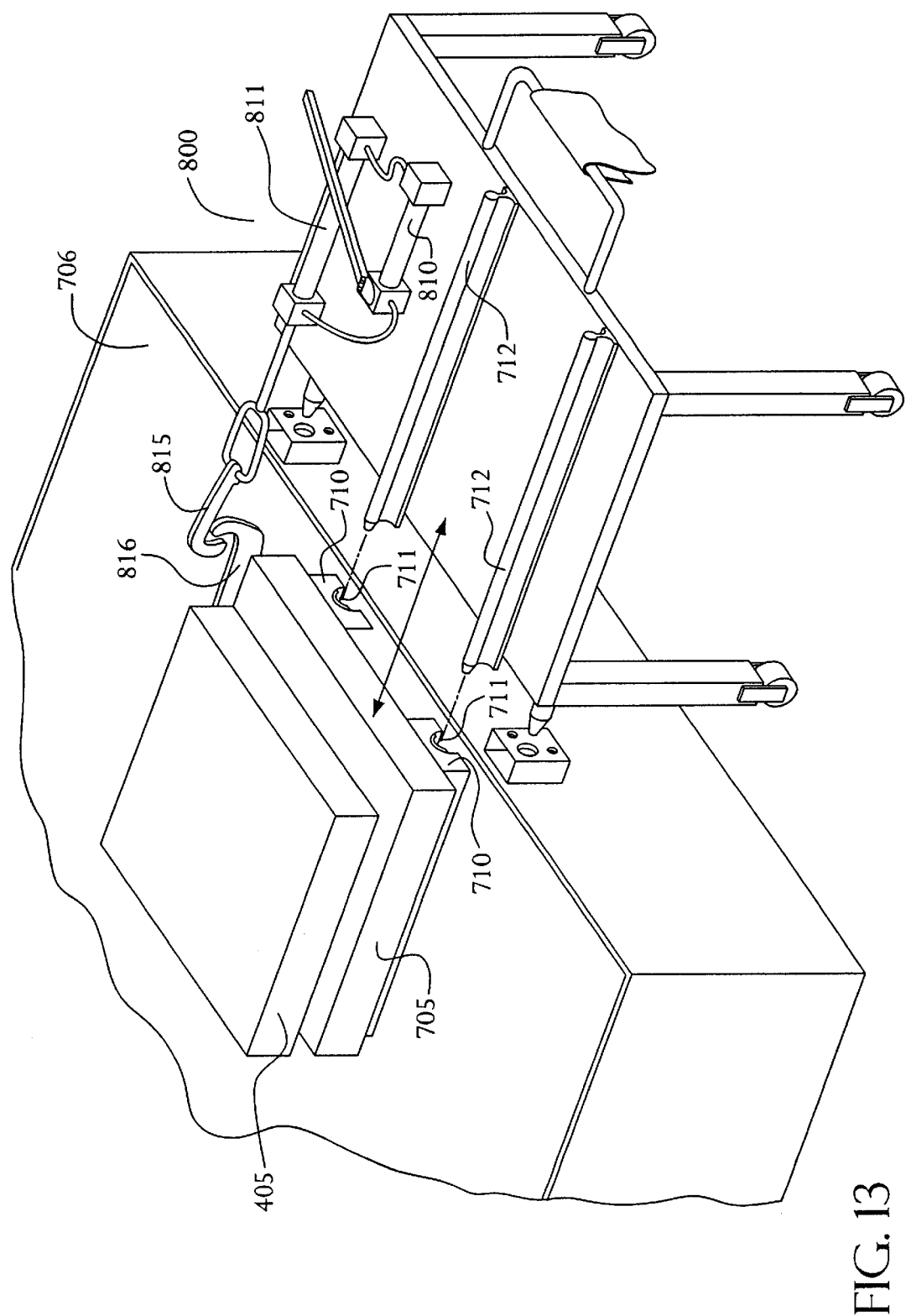
FIG. 13 is a perspective view of apparatus for removal and installation of a bottom and top pallet assembly.
Figure 14:
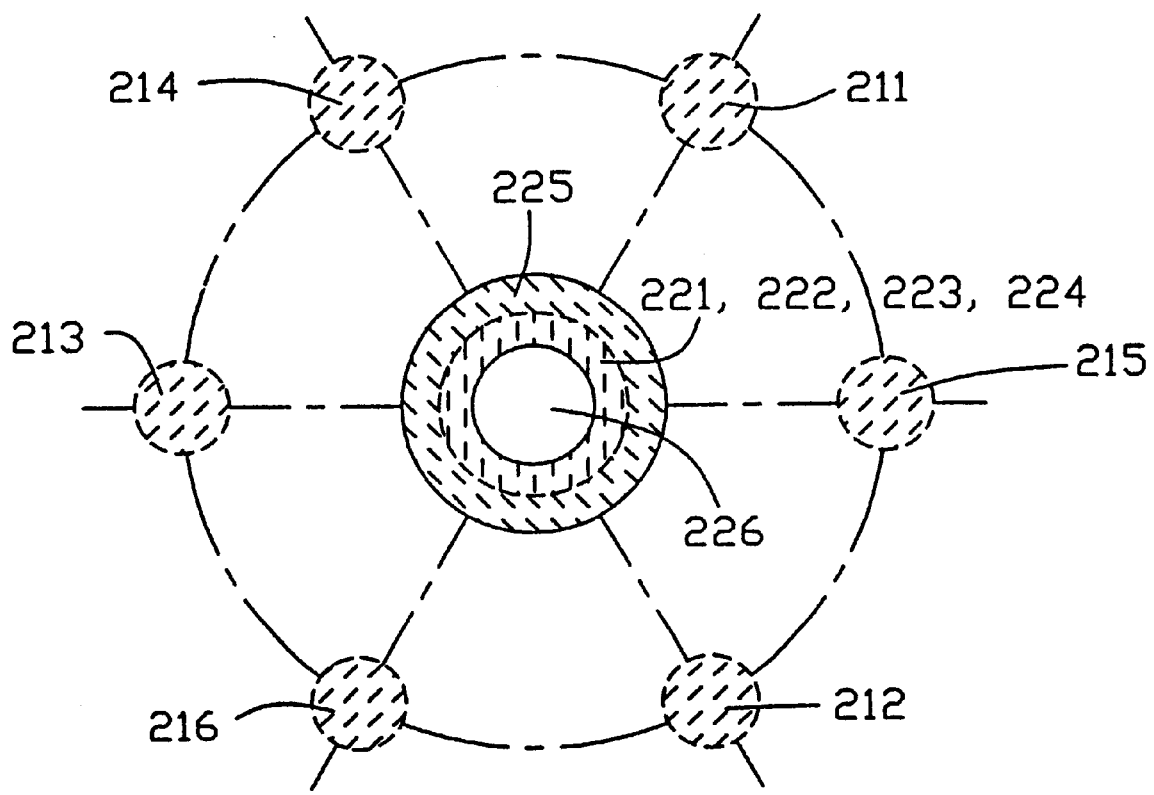
FIG. 14 is a side elevation view of a workpiece comprising a six-pin crankshaft that illustrates the angular spatial relationship among the pins.

In the embodiment of the heat treatment station shown in FIG. 11 the base plate 405 is attached to a fixture plate 705. Details of the bottom and attached top pallet assemblies are not included in FIG. 11 but are disclosed elsewhere in the specification. Fixture plate 705 has linear bearings 710 that allow the base plate 405 and its connected bottom and top pallet assemblies to move on guide rails 711. Rails 711 are fixed to rail plate 706, which is removably attached to the structural foundation 707 for the heat treatment station. As shown in FIG. 13, coil changeover dolly 800 provides an efficient means of removing and installing a complete pallet assembly consisting of bottom and top pallet assemblies. The dolly includes guide rails 712 that align with guide rails 711 when the dolly is positioned adjacent to the heat treatment station. A suitable jacking system, illustrated as a hydraulic hand pump 810 and cylinder 811 in FIG. 13, can move the complete pallet assembly from the heat treatment system. The pivoting mechanism attached to the top pallet assembly, namely pivot lever 750 will slide out of the back plate 505 as the complete pallet assembly is removed. Catch latch 815, attached to cylinder 811 locks with engaging latch 816 suitably attached to the fixture plate 705 or other component of the bottom or top pallet assembly. Once a complete pallet assembly has been removed, a replacement pallet assembly can be installed from the dolly in reverse order by pushing the replacement pallet assembly off of dolly rails 712 and on to station rails 711. This arrangement provides a significant improvement over alternative embodiments wherein the components of a bottom and top pallet assembly are hard-mounted to the foundation of the heat treatment station. In the later instance, if a component such as a bottom inductor segment requires replacement, the heat treatment system must be shut down while the bottom inductor segment is removed and replaced. Using the disclosed apparatus and method of the present invention, the bottom and attached top pallet assembly containing the defective bottom inductor segment can be removed and immediately replaced with a non-defective pallet assembly while the defective bottom inductor segment is replaced away from the heat treatment system. Additionally, such a heat treatment system can be economical since heat treatment of differently configured workpieces that can be heat treated in the same number of stations can be accomplished by changing out complete pallet assemblies rather than replacing the complete heat treatment system. When a pallet assembly is moved into place, suitable adjusting means are provided for properly positioning the pallet assembly relative to the workpiece positioning system so that a workpiece lowered into the bottom pallet assembly will properly seat in the bottom pallet assembly. In FIG. 11 representative adjusting means are shown as a screw-driven adjustable hard stop 820 that adjusts the position of the base plate 405, along with attached bottom and top pallet assemblies, relative to structural foundation 707 in the direction of the Y-axis. Additionally representative adjusting means are provided in FIG. 11 for providing rotational adjustment of the base plate 405 in the X-Y plane. Clamp 822 can be pivoted and locked into a selected position relative to structural foundation 707.

Each heat treatment station, in addition to one or more bottom and top inductor segments for heat treating preselected workpiece components, has a workpiece positioning system. The workpiece positioning system orients the workpiece so that the pre-selected workpiece components will properly sit in the partial workpiece openings of the bottom inductor coils, and the through openings in the bottom inductor segments. Proper siting of the workpiece in the bottom pallet assembly components may require rotation or translation in the axial direction (or both rotation and translation) of the workpiece at each station. The workpiece positioning system may consist of components associated with the crane 40 or components located at each heat treatment station, or a combination of these two, to ensure that a workpiece is properly sited at a station.

Figure 12A:
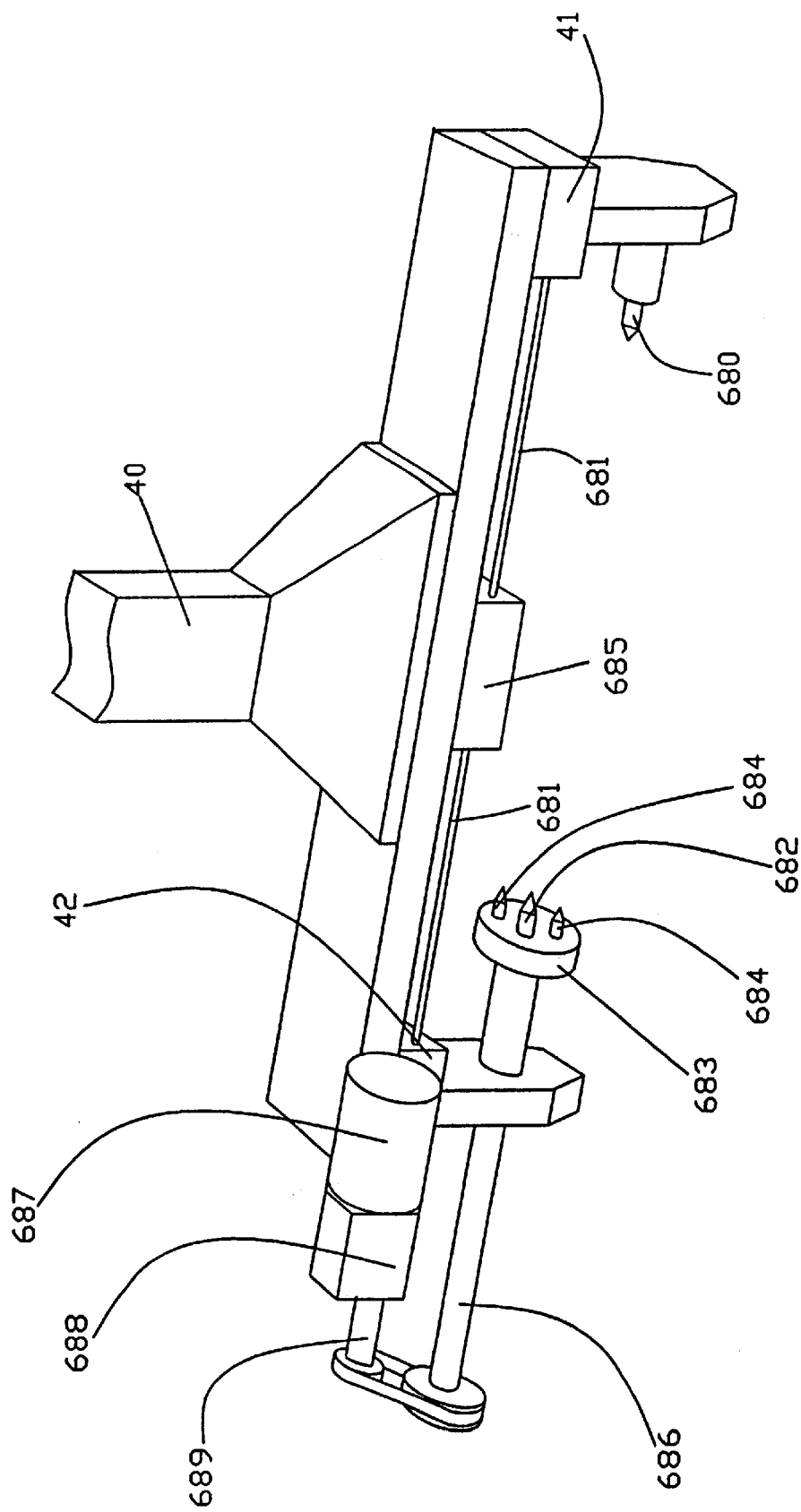
FIG. 12(a) is a perspective view of an optional workpiece station positioning system in combination with the crane of a workpiece transport system for the heat treatment system of the present invention.

A typical workpiece positioning system associated with the workpiece transport system is shown in FIG. 12(a). Crane 40 has two spindles 680 and 682 mounted on independently moving arms 41 and 42, respectively, that can move in the lateral directions indicated by the arrows. Control box 685 controls lateral motion of the two arms by connecting means 681. Main spindle 682 is mounted on rotor 683. Rotor 683 is connected to rotational shaft 686. Rotary driver 687 is suitably connected to rotational shaft 686, for example, by a belt and pulley transmission with reduction gearbox 688 and output shaft 689, to rotate shaft 686 and attached rotor 683. Main spindles 680 and 682 engage a workpiece for transporting it to, from and between heat treatment stations by laterally moving both spindles 680 and 682 towards one another to securely grasp both ends of the workpiece. At the same time, positioning pins 684 engage corresponding positioning holes provided on the end of the workpiece. When a crane initially picks up a workpiece for heat treatment, for example, at a load station, the workpiece will be oriented in a position that the workpiece positioning system recognizes as the initial angular position of the axis of the workpiece. In this manner, the system can make all rotations of the workpiece in each heat treatment station relative to this initial angular position.

Figure 12B:
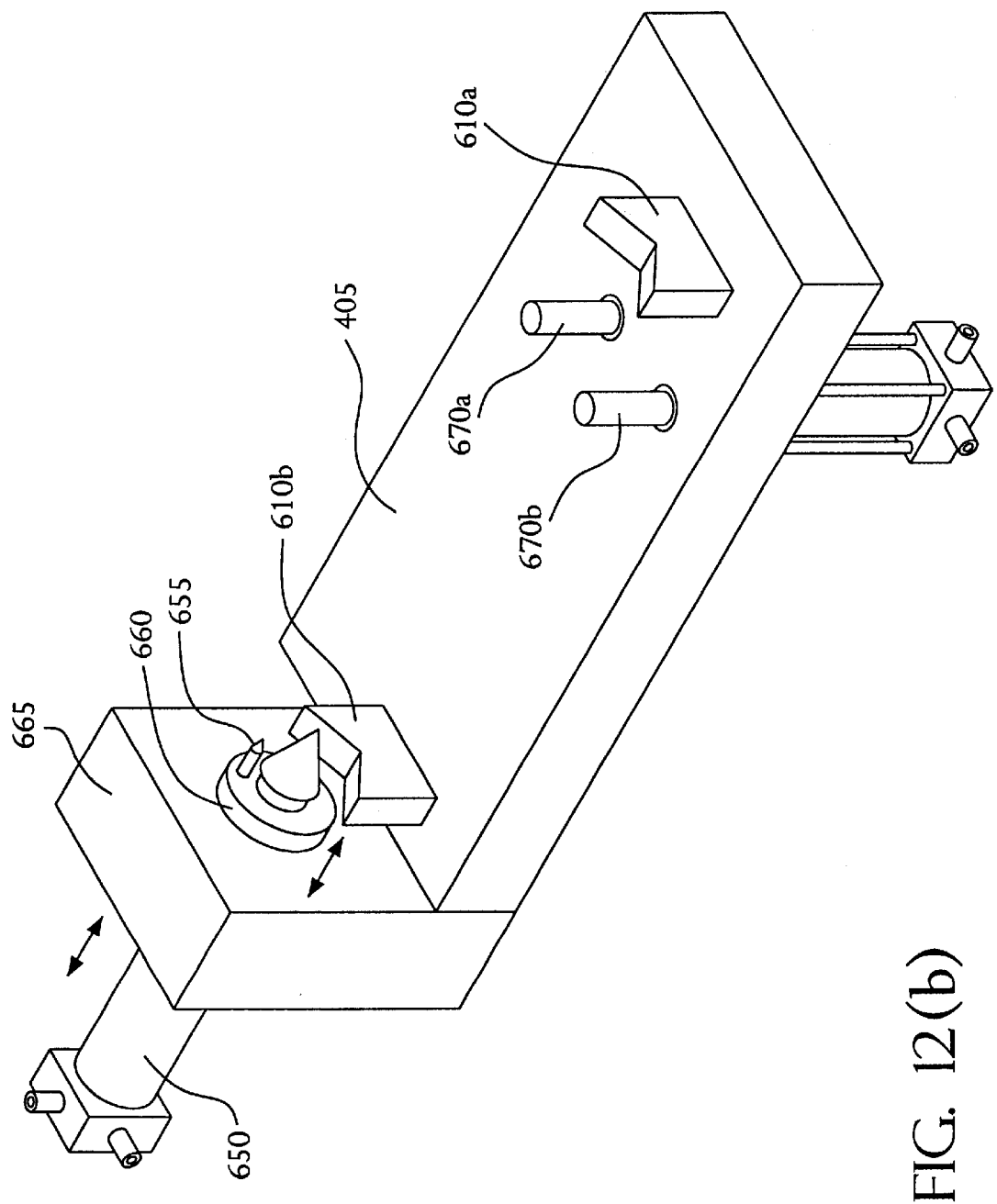
FIG. 12(b) is a perspective view of an optional workpiece station positioning system located in a heat treatment station.

FIG. 12(b) illustrates an optional workpiece positioning system that can be located at each heat treatment station. As mentioned above, each bottom pallet assembly 400 includes a base plate 405. Seating blocks 610a and 610b are attached to the base plate and are positioned to seat selected components of the workpiece. While shown as V-blocks, other suitable seating means, such as U-brackets, may be used. The seating of the workpiece in the seating blocks may not be sufficient to properly position the workpiece at the station for heating. Therefore, X-axis adjusting means and rotational adjusting means can also be provided at each station.

As shown in FIG. 12(b), cylinder 650 serves as an X-axis adjusting means by exerting a force in a direction substantially parallel to the center axis of the workpiece at the end of the workpiece seated on block 610b. Structure 665 serves as mounting and positioning structure for cylinder 650. Cylinder 650 may be manually or mechanically driven (e.g., an electrical or hydraulic drive not shown in the figures) in either a positive or negative direction (referenced to the arrows shown in FIG. 12(b) with movement in the positive direction being towards block 610a) to either push the workpiece in the x-direction or withdraw from contact with the workpiece. Pin 655 is mounted on a rotatable disc 660 to provide a means for rotating the workpiece while seated in the seating means. The end of pin 655 can be relatively positioned to the end of cylinder 650 so that when the end of cylinder 650 contacts the workpiece, end of pin 655 will contact the workpiece. Rotating the disk 660 will cause the workpiece to also rotate by contact with the pin 655. Structure 665 serves as mounting and positioning structure for rotatable disc 660 and can also be used to enclose the rotational drive means for the disc. The rotational drive, as for the cylinder 650, may be manual or mechanical. Alternatively or in concert with the above adjusting means, rotational adjusting means such as height blocks 670a and 670b that engage pre-selected off-main-axis workpiece components to ensure that off-main-axis workpiece components to be heat treated in the station's inductors are properly positioned, may be used.

Figure 15:
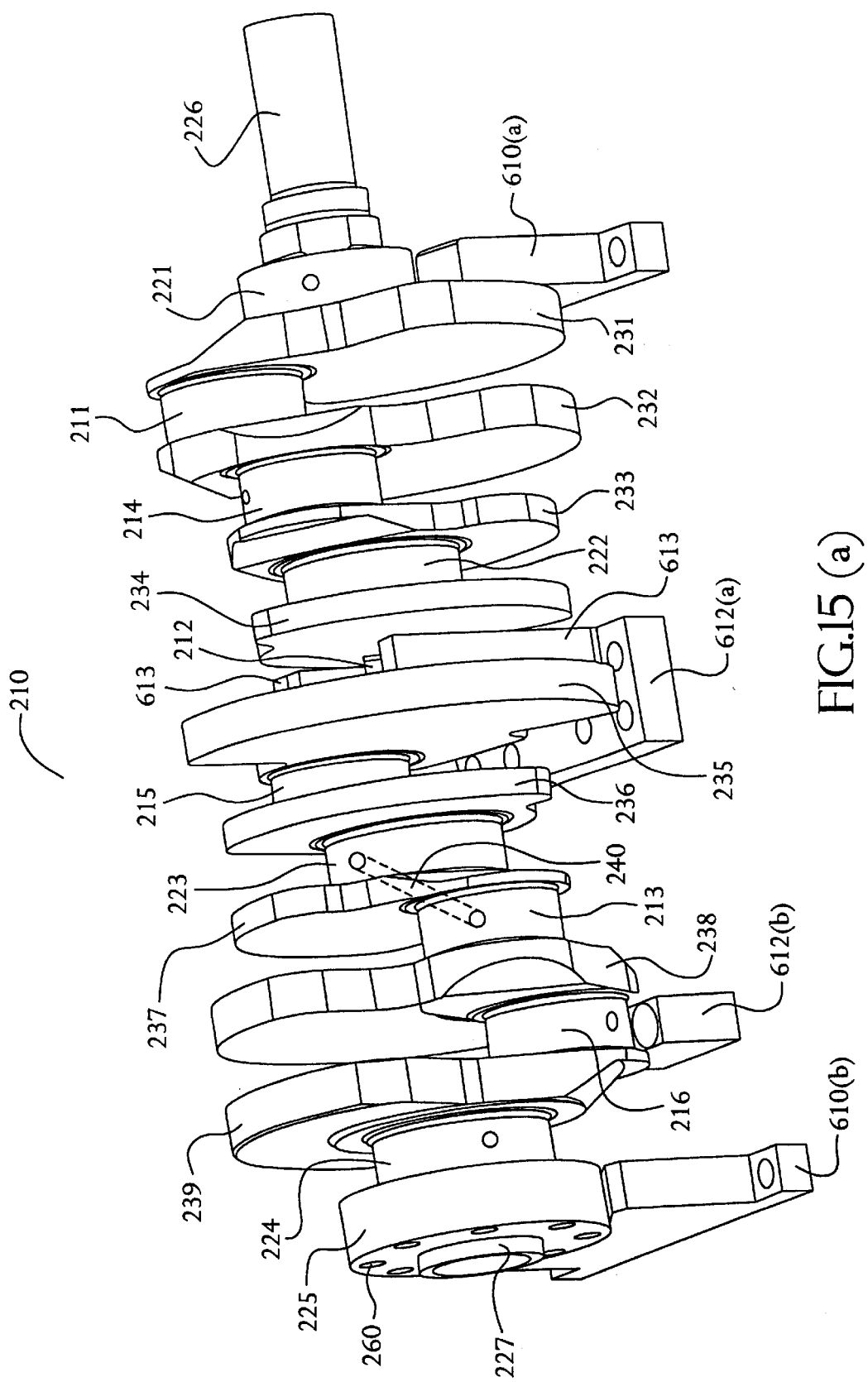
FIG. 15(a) is a perspective view of the six-pin crankshaft of FIG. 14 properly positioned in a first heat treatment station of the present invention.
FIG. 15(b) is a perspective view of the six-pin crankshaft of FIG. 14 properly positioned in a second heat treatment station of the present invention.
FIG. 15(c) is a perspective view of the six-pin crankshaft of FIG. 14 properly positioned in a third heat treatment station of the present invention.
Figure 15:
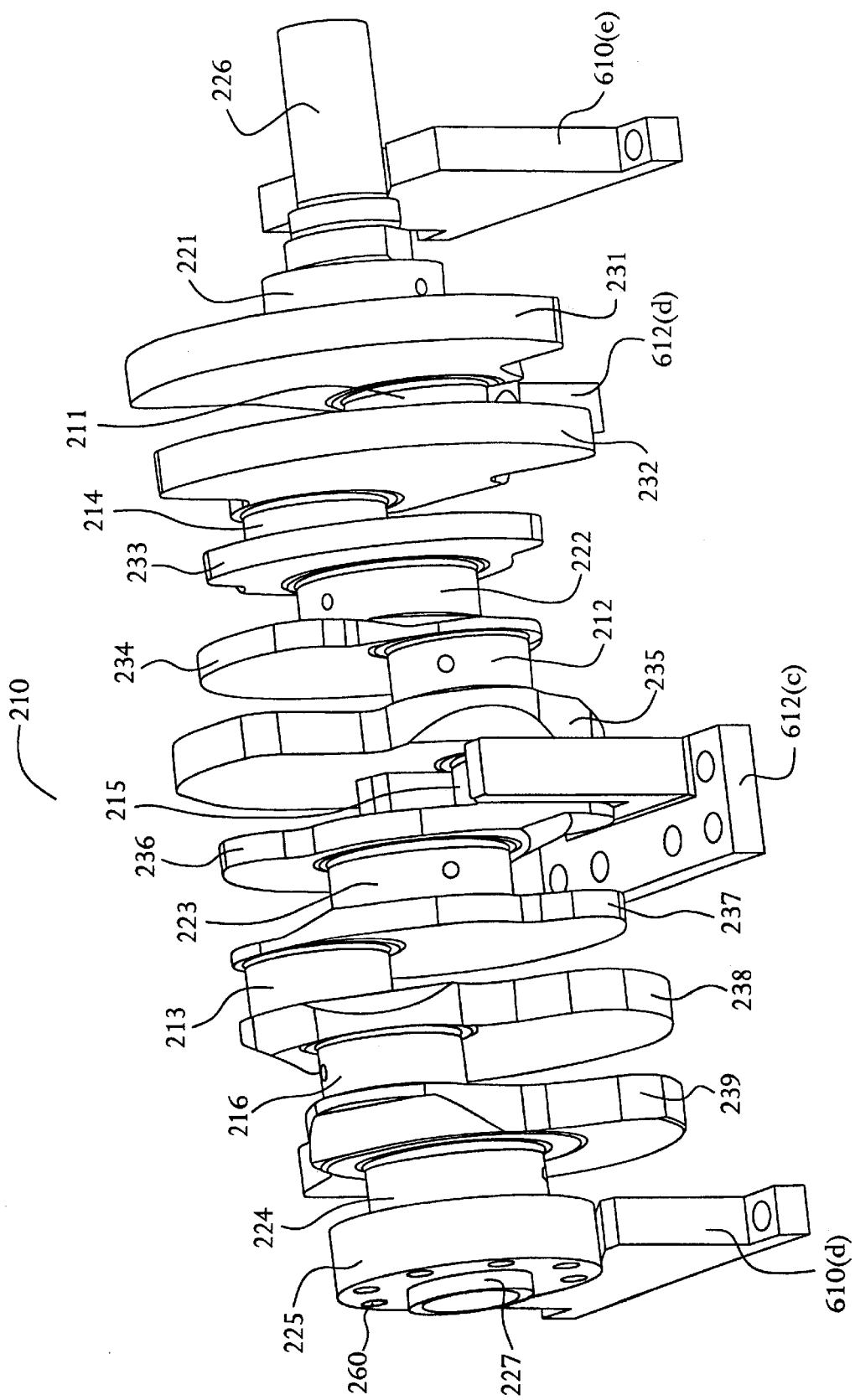
Figure 15:
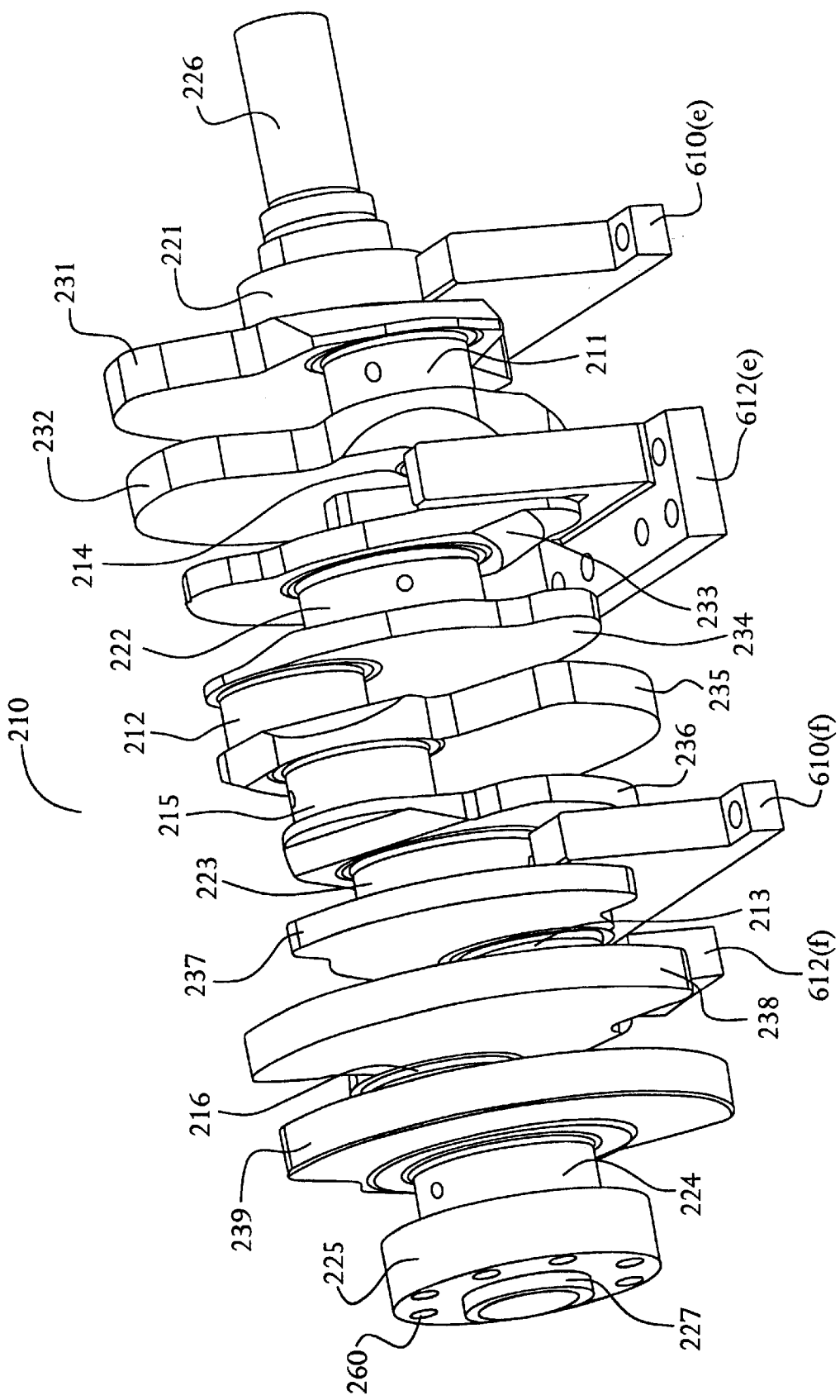

In one embodiment of the invention, the induction heat treatment system 10 is used to heat treat crankshaft 210 shown in FIG. 14, and FIG. 15(a) through FIG. 15(c). Pins 1, 2, 3, 4, 5 and 6 of the crankshaft are axially offset from and parallel to the axis of the main axial components of the crankshaft, and are identified as elements 211, 212, 213, 214, 215 and 216, respectively. Main axial components axially coincident with the axis of the crankshaft consist of mains 1, 2, 3 and 4, identified as elements 221, 222, 223 and 224, and seal 225. Webs 231 through 239 interconnect pins and mains as shown in FIG. 15(a) through FIG. 15 (c). The webs serve as counterweights, and therefore assume irregular and non-symmetrical shapes. Flywheel attachment element 227 is provided at the same end of the crankshaft as seal 225. At the opposing end of the crankshaft, crank nose 226 is attached to main 1 (221) and is typically used as a mount for a camshaft drive sprocket, pulley and/or vibration damper mounting. The artisan will appreciate that the crankshaft terminating components, namely, elements 225, 226 and 227 can vary in quantity and use, depending upon the particular application of the crankshaft 210 without deviating from the scope of the invention. Furthermore, pin configurations can be varied and mixed with double-width (common) and split pin configurations. Openings 260 in the seal 225 can be used as reference positioning holes for the crankshaft positioning system.

Figure 9B:
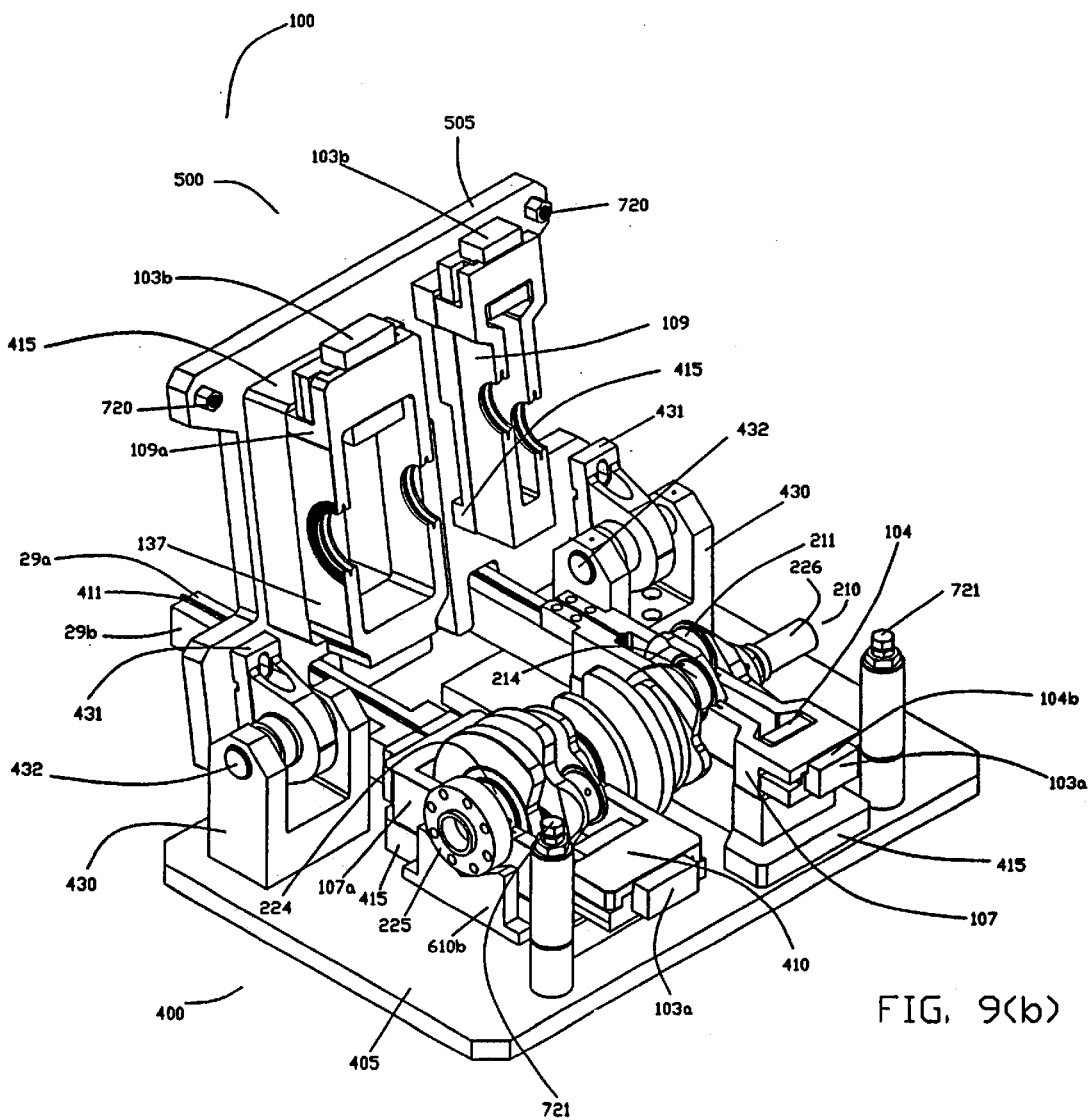
FIG. 9(b) is perspective view of a typical heat treatment station's pallet assembly with a typical workpiece sited in the bottom pallet assembly.

FIG. 15(a) shows the configuration of crankshaft 210 after it has been seated in the first heat treatment station 31 by the workpiece positioning system. Pins 211 and 214, and mains 223 and 224 are heated in the first station. FIG. 9(b) shows crankshaft 210 seated in first heat treatment station 31. The crankshaft is seated in station 31 on supporting blocks 610a (not visible in FIG. 9(b)) and 610b. Proper orientation for induction heat treatment of pins 211 and 214 in station 31 is achieved by the use of height blocks 612a and 612b at pins 212 and 216 respectively. In FIG. 9(b) block 612b is not visible, but is mounted to base plate 405 within spacer 415 associated with bottom inductor segment 107a. Block 612a (not visible in FIG. 9(b)) is mounted to base plate 405 between bottom inductor segments 107 and 107a and has extended side limbs 613. As the workpiece transport system lowers the crankshaft into station 31 limbs 613 will act as a profile gage to prevent crankshaft components from crashing into the bottom inductor segments in the event of a misalignment of the crankshaft. After seating the crankshaft in the station, the limbs 613 can be used as hard stops against web 234 when the workpiece transport system pushes the crankshaft in its axial direction from the crank nose end to the oil seal end.

FIG. 15(b) shows the configuration of crankshaft 210 after it has been seated in the second heat treatment station 32 by the workpiece positioning system. Pins 213 and 216, and mains 221 and 222 are heat treated in the second station. The crankshaft is seated in station 32 on supporting blocks 610c and 610d. Proper orientation for induction heat treatment of pins 213 and 216 in station 32 is achieved by the use of height blocks 612c and 612d at pins 215 and 211 respectively. Mounting of the supporting and height blocks to base plate 405 is similar to that for station 31 with suitable orientation changes to account for the differing arrangement of inductor segments to heat pins 213 and 216, and mains 221 and 222.

Figure 16A:
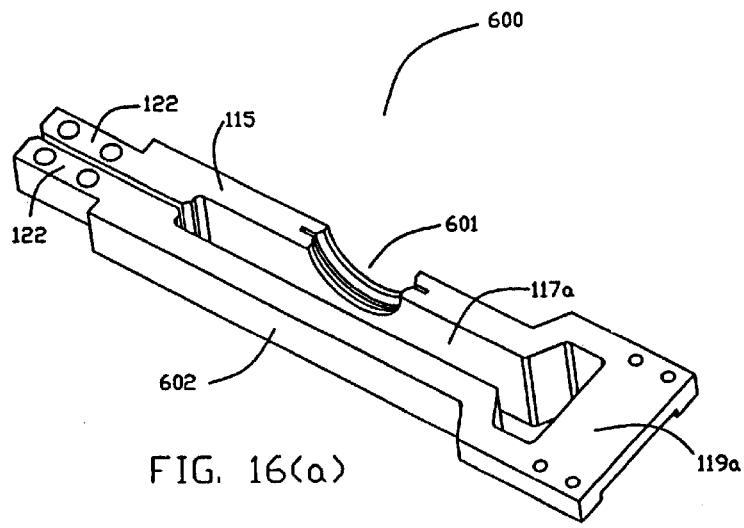
FIG. 16(a) is a perspective view of a first or bottom inductor segment of the present invention that is used to heat treat one end workpiece component where the end of the workpiece does not have a protruding non-heat treated end element.
Figure 16B:
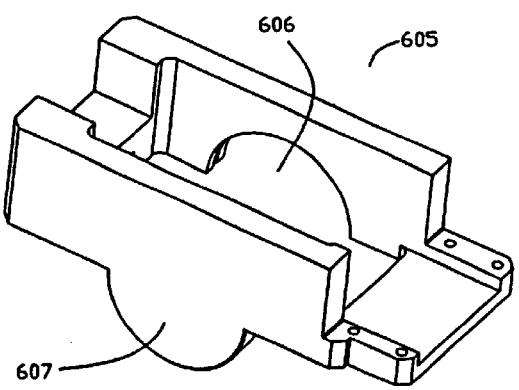
FIG. 16(b) is a perspective view of a second or top inductor segment of the present invention that is used to heat treat one end workpiece component where the end of the workpiece has a protruding non-heat treated end element.
Figure 16C:
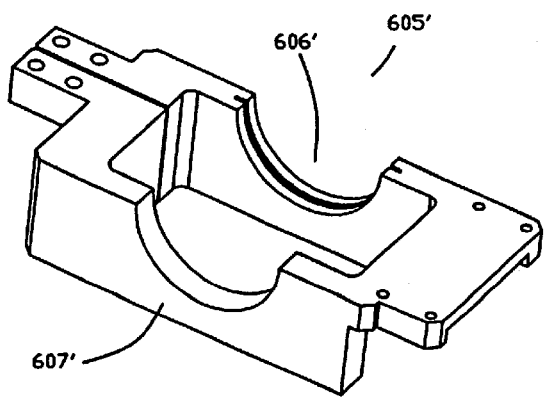
FIG. 16(c) is a perspective view of a first or bottom inductor segment of the present invention that is used to heat treat one end workpiece component where the end of the workpiece has a protruding non-heat treated end element.

FIG. 15(c) shows the configuration of crankshaft 210 after it has been seated in the third heat treatment station 33 by the workpiece positioning system. Pins 212 and 215, and the oil seal 225 are heated in the third station. The crankshaft is seated in station 33 on supporting blocks 610e and 610f. Proper orientation for induction heat treatment of pins 212 and 215 in station 33 is achieved by the use of height blocks 612e and 612f at pins 214 and 213 respectively. Mounting of the supporting and height blocks to base plate 405 is similar to that for station 31 with suitable orientation changes to account for the differing arrangement of inductor segments to heat pins 212 and 215, and oil seal 225. Station 33 differs from stations 31 and 32 in that only one main axial component, namely seal 225, is heat treated in the station. In such a configuration, two partial workpiece openings can still be provided in the top and the bottom dual inductor segments, even though one will not be used. In any event, some type of shaped coil segment should be provided in the unused segment pairs to balance current flow through the inductor segments. A through passage may be required for the workpiece in the unused segment pair and alternative coil designs that maintain good magnetic coupling between the top and bottom segments can be used. FIG. 16(a) illustrates a typical bottom inductor segment 600 that could be used to heat treat oil seal 225 in partial opening 601. In this configuration the second coil segment 602 is not used. The corresponding top inductor segment would generally be a mirror image of the bottom inductor segment without power termination regions 122. For a heat-treated end element with an axially protruding non-heat treated end element, such as main 221 and crank nose 226, respectively, the typical top and bottom inductor segments 605 and 605' shown in FIG. 16(b) and FIG. 16(c) respectively, could be used to heat treat only main 221 in partial openings 606 and 606'. The second coil segments 607 and 607' consist of a semicircular element and a semicircular opening within which the semicircular element sites.

As shown in FIG. 15(a) though 15(c), at all heat treatment stations, the axial distance between adjacent paired features is maximized to prevent potential mechanical interference of their coil bus and or core assemblies. Additionally, pins or mains coils do not operate within or between other parallel coil sets.

The use of side shields and profiling as disclosed above is applied to crankshaft 210 particularly with respect to skewed oil passages typically drilled through an adjacent main and pin and the joining web as representatively shown by passage 240 for pin 213, web 237 and main 223 in FIG. 15(a). Additionally, for the single segment pair of U-shaped flux concentrators used with each bottom and top inductor segments shown in FIG. 3(a), the length of each concentrator segment, $x_1$, which is generally equal to the length of the inductor segments' flux concentrator regions, should be at least greater than 0.5 times the width, $x_5$, of the workpiece component through openings in the bottom and top inductor segments when the workpiece component being treated is a conventional pin or main. When the workpiece component is a double-width (common) pin or split pin, the length of each concentrator segment should be at least greater than 0.25 times the width of the through openings in the inductor segments. If multiple pairs of flux concentrators are used, the sum of the individual widths of all concentrators should satisfy the $x_1$ dimensional requirement. Dimensions $x_2$, $x_3$, $x_4$ and $x_5$ of a flux concentrator segment as shown in FIG. 3(a) are selected to avoid magnetic saturation in the flux concentrator. In some instances, such as that shown for the bottom and top inductor segments in FIG. 2(a) and FIG. 2(b) respectively, the width of the through opening must be increased at the end of the inductor segments where the flux inductor surrounds them to satisfy this requirement.

Preferably, the active width, $x_5$, of the inductor segment surrounded by a flux concentrator should be greater than 0.75 times the axial width of the through openings in the bottom and top inductor segments when the workpiece component being treated is a conventional pin or main, and 0.45 times the active width, $x_5$, of the through openings in the bottom and top inductor segments when the workpiece component is a double-width (common) pin or split pin.

The foregoing embodiments do not limit the scope of the disclosed invention. The scope of the disclosed invention is covered in the appended claims.

What is claimed is:

1. An induction heat treatment system for the heat treatment of pre-selected components of a metal workpiece having a central longitudinal axis, the workpiece comprising two or more first substantially cylindrical components coaxially arranged along said central longitudinal axis, one or more second substantially cylindrical components interposed between said two or more first substantially cylindrical components, each one of said one or more second substantially cylindrical components having an independent axis offset from and in parallel with said central longitudinal axis, each of said first and second substantially cylindrical components connected to an adjacent non-heat treated irregularly-shaped component, said induction heat treatment system comprising:

at least one ac high frequency power supply;

one or more stations for induction heat treatment of one or more pre-selected first and second substantially cylindrical components in each one of said one or more stations, each one of said one or more stations comprising:

a first pallet assembly comprising:

an at least one first inductor segment formed from electrically conductive material, each one of said at least one first inductor segment having a facing surface and an interior through opening, said interior through opening forming a first coil segment and a second coil segment on opposing sides of said interior through opening, at least one of said first or said second coil segments having a first partial component opening, said first partial component opening having a generally arcuate coil surface, each one of said at least one first inductor segment having means for connecting said first inductor segment to the output of one of said at least one ac high frequency power supply; and an at least one first magnetic flux concentrator segment having at least two facing surfaces, each one of said at least one first magnetic flux concentrator segment disposed partially around a flux concentrator area of said at least one first inductor segment;

a second pallet assembly comprising:

at least one second inductor segment formed from electrically conductive material, each one of said at least one second inductor segment having a facing surface and an interior through opening, said interior through opening forming a third coil segment and a fourth coil segment on either side of said interior through opening, at least one of said third or fourth coil segments having a second partial component opening, said second partial component opening having a generally arcuate coil surface, the facing surface and interior through opening of each one of said at least one second inductor segment having a corresponding opposing facing surface and interior through opening in one of said at least one first inductor segment, and each one of said second partial component opening having a corresponding opposing first partial component opening in one of said at least one first inductor segment; and an at least one second magnetic flux concentrator segment having at least two facing surfaces, each one of said at least one second magnetic flux concentrator segment disposed partially around a flux concentrator area of said at least one second inductor segment; each one of said at least two facing surfaces having a corresponding opposing one of said at least two facing surfaces on one of said at least one first magnetic flux concentrator segment, and a dielectric material disposed on the facing surface of each one of said at least one first inductor segment or said at least one second inductor segment;

a workpiece transport system to move said metal workpiece between said one or more stations and seat said metal workpiece in each one of said one or more stations;

a workpiece positioning system to rotatively orient said one or more pre-selected second substantially cylindrical components and to axially orient said metal workpiece for heat treatment of said one or more pre-selected first and second substantially cylindrical components in each one of said one or more stations; and means for selectively moving said second pallet assembly adjacent to said first pallet assembly, whereby the facing surface of each one of said at least one second inductor segment and each one of the at least two facing surfaces of said at least one second magnetic flux concentrator segment are adjacent to said corresponding opposing facing surface of each one of said at least one first inductor segment and said corresponding opposing one of said at least two facing surfaces of said at least one first magnetic flux concentrator segment, respectively, and each of said second partial component opening and corresponding opposing first partial component opening form a substantially closed inductor within which one of said pre-selected first or second substantially cylindrical components is heated by a magnetic field generated by said substantially closed inductor in response to excitation by high frequency ac current from said at least one ac high frequency power supply.

2. The induction heat treatment system of claim 1 further comprising a quenching system to supply quenchant to at least one of said pre-selected first or second substantially cylindrical components within said substantially closed inductor.

3. The induction heat treatment system of claim 1 wherein the output of each one of said at least one ac high frequency power supply is connected to a load matching transformer and said load matching transformer is dedicatedly connected to each one of said at least one first inductor segment.

4. The induction heat treatment system of claim 1 wherein each one of said at least one first magnetic flux concentrator segment is U-shaped and each one of said at least one second magnetic flux concentrator segment is rectangularly-shaped, and each one of said at least one second magnetic flux concentrator segment weighs less than each one of said at least one first magnetic flux concentrator segment.

5. The induction heat treatment system of claim 1 wherein said arcuate coil surface of either said first or second partial component opening is profiled to control the shape of said magnetic field in the vicinity of said one of pre-selected first or second substantially cylindrical components to be heated within said substantially closed inductor.

6. The induction heat treatment system of claim 5 further comprising an orifice in said arcuate coil surface, said orifice dividing the arcuate coil surface into a pair of coil lips, said pair of coil lips forming an interface region with adjoining said facing surface of said at least one first or second inductor segment wherein the axial width of each one of said pair of coil lips is profiled to be greater in said interface region than in the vicinity of a base region located approximately 90 degrees offset from said interface region, each one of said coil lips further profiled to a circumferential length, $d_2$, of less than twice the axial width of said one of said pre-selected first or second substantially cylindrical components to be heat treated within the substantially closed inductor, and to an axial transition width, $d_1$, of less than 0.3 times the axial width of said one of said pre-selected first or second substantially cylindrical components to be heat treated within the substantially closed inductor.

7. The induction heat treatment system of claim 6 wherein each one of said coil lips is further profiled to a narrower axial width adjacent to an opening on the surface of said one of said pre-selected first or second substantially cylindrical components to be heat treated within the substantially closed inductor.

8. The induction heat treatment system of claim 6 wherein each one of said coil lips is further profiled by a radial recession of each one of said coil lips adjacent to an opening on the surface of said one of said pre-selected first or second substantially cylindrical components to be heat treated within the substantially closed inductor, wherein the width, $a_1$, of said radial recession is less than three times the diameter of said opening.

9. The induction heat treatment system of claim 1 wherein at least one side shield composed of an electrically conductive and magnetic material is provided on at least one side of at least one of said first or second coil segments having a first partial component opening, or said third or fourth coil segments having a second partial component opening, said side shield having an array of slotted teeth disposed at least partially around the perimeter of said first or second partial component opening wherein the ratio of the width of each slot separating adjacent teeth to the width of each tooth is less than 5.

10. The induction heat treatment system of claim 9 wherein said side shield has an elongated open slot in the vicinity of an opening on the surface of said one of pre-selected first or second substantially cylindrical components to be heated within the substantially closed inductor, wherein the width of the elongated slot is limited to less than three times the diameter of said opening.

11. The induction heat treatment system of claim 1 wherein said substantially closed inductor forms an ovoid opening to modify said magnetic field for the presence of said adjacent non-heat treated irregularly-shaped component or an opening on the surface of said one of said pre-selected first or second substantially cylindrical components to be heat treated within said substantially closed inductor.

12. A method of heat treating pre-selected components of a metal workpiece comprising at least two first substantially cylindrical components arranged coaxially along the main axis of said workpiece, one or more second substantially cylindrical components interposed between said at least two first substantially cylindrical components, each one of said one or more second substantially cylindrical components having an independent axis offset from and in parallel with said main axis, each one of said first and second substantially cylindrical components connected to an adjacent non-heat treated irregularly-shaped component, the method comprising:

engaging said metal workpiece;

transporting said metal workpiece to an induction heat treatment station;

rotating said metal workpiece to angularly orient each one of said pre-selected second substantially cylindrical components for siting within a stationary partial inductor opening for each one of said pre-selected second substantially cylindrical components in said induction heat treatment station;

translating said metal workpiece to axially orient each one of said pre-selected first and second substantially cylindrical components for siting within a stationary partial inductor opening for each one of said pre-selected first and second substantially cylindrical components in said induction heat treatment station;

seating said metal workpiece in said induction heat treatment station;

positioning a non-stationary partial inductor adjacent to each one of said stationary partial inductor openings to form a substantially closed inductor around each one of said pre-selected first and second substantially cylindrical components;

applying an ac high frequency current to each one of said stationary partial inductors;

inductively coupling said ac high frequency current to each one of said non-stationary partial inductors;

inductively heating said pre-selected first and second substantially cylindrical components by imposing a magnetic field established by said ac high frequency current on said pre-selected first and second substantially cylindrical components;

positioning each one of said non-stationary partial inductors away from each one of said stationary partial inductors; and transporting said metal workpiece from said induction heat treatment station.

13. The method of claim 12 further comprising the step of quenching at least one of said pre-selected first and second substantially cylindrical components simultaneously with or following the step of inductively heating.

14. The method of claim 12 further comprising the step of modifying said magnetic field to compensate for the irregular mass of one of said adjacent non-heat treated irregularly-shaped components.

15. The method of claim 12 further comprising the step of modifying said magnetic field to compensate for an opening in at least one of said pre-selected first or second substantially cylindrical components.

16. An inductor for heating at least one substantially cylindrical component of a metal workpiece, said substantially cylindrical component attached on at least one side to an irregularly-shaped component, a fillet formed between said irregularly-shaped component and said substantially cylindrical component, the inductor formed from a first inductor segment and a second inductor segment, said first and second inductor segments having means for magnetically coupling to said second inductor segment an ac high frequency current supplied to said first inductor, a substantially closed opening formed partially in said first inductor segment and partially in said second inductor segment for placement of said substantially cylindrical component for heating by application of a magnetic field generated by said first and second inductor segments in response to excitation by said ac high frequency current to said component, the improvement comprising:

said first inductor segment formed from a solid electrically conductive material, said first inductor segment further comprising:

a first facing surface;

a through opening forming a first coil segment and a second coil segment disposed on opposing sides of said through opening; and a first partial opening in either said first or second coil segment, said first partial opening having an arcuate coil surface divided by an orifice, said orifice dividing said arcuate coil surface into a first pair of coil lips, said first pair of coil lips forming an interface region with adjoining said first facing surface wherein said first pair of coil lips are profiled to selectively compensate for the irregular mass of said irregularly-shaped component, an opening on the surface of said substantially cylindrical component, or selective heating of said fillet; and said second inductor segment formed from a solid electrically conductive material, said second inductor segment further comprising:

a second facing surface, said second facing surface disposed substantially adjacent to and electrically isolated from said first facing surface;

a through opening forming a third coil segment and a fourth coil segment disposed on opposing sides of said through opening; and a second partial opening in either said third or fourth coil segment, said second partial opening having an arcuate coil surface divided by an orifice, said orifice dividing said arcuate coil surface into a second pair of coil lips, said second pair of coil lips forming an interface region with adjoining said second facing surface wherein said second pair of coil lips are profiled to selectively compensate for the irregular mass of said irregularly-shaped component, an opening on the surface of said substantially cylindrical component, or selective heating of said fillet, said first and second partial openings forming said substantially closed opening.

17. The inductor of claim 16 wherein the axial width of each one of said first or second pair of coil lips is profiled to be greater in said interface region than in the vicinity of a base region located approximately 90 degrees offset from said interface region, each one of said coil lips further profiled to a circumferential length, $d_2$, of less than twice the axial width of said substantially cylindrical component, and to an axial transition width, $d_1$, of less than 0.3 times the axial width of said substantially cylindrical component.

18. The inductor of claim 17 wherein said first or second pair of coil lips is profiled to a narrower axial width adjacent to an opening on the surface of said substantially cylindrical component.

19. The inductor of claim 18 wherein said first or second pair of coil lips is further profiled by a radial recession of said coil lips adjacent to an opening on the surface of said substantially cylindrical component wherein the width, $a_1$, of said recession is less than three times the diameter of said opening.

20. The inductor of claim 16 wherein said orifice in said arcuate coil surface of said first or second partial opening comprises a plurality of discrete perforations.

21. The inductor of claim 16 further comprising at least one side shield disposed on at least one side of said first partial opening or said second partial opening to selectively compensate for the irregular mass of said irregularly-shaped component, an opening on the surface of said substantially cylindrical component, or selective heating of said fillet, said at least one side shield composed of an electrically conductive and magnetic material.

22. The inductor of claim 21 wherein said at least one side shield has an edge flush with the adjacent arcuate coil surface of said first partial opening or said second partial opening.

23. The inductor of claim 21 wherein said at least one side shield has an edge receded from the adjacent arcuate coil surface of said first partial opening or said second partial opening.

24. The inductor of claim 21 wherein said at least one side shield has an array of slotted teeth disposed at least partially around the perimeter of said first or second partial opening wherein the ratio of the width of each slot separating adjacent teeth to the width of each tooth is less than 5.

25. The inductor of claim 21 wherein said at least one side shield has an elongated open slot in the vicinity of an opening on the surface of said substantially cylindrical component wherein the width of the elongated slot is limited to less than three times the diameter of said opening.

26. The inductor of claim 16 having said first or second pair of coil lips are profiled to compensate for an opening on the surface of said substantially cylindrical component.

27. The inductor of claim 16 wherein said first and second partial openings form a substantially closed ovoidal opening to selectively compensate for the irregular mass of said irregularly-shaped component or an opening on the surface of said substantially cylindrical component.

28. The inductor of claim 16 further comprising an electrically conductive compensator, said compensator attached to said first or second inductor segment or adjacent to a void in said irregularly-shaped component.

29. An inductor for heating at least one substantially cylindrical component of a metal workpiece, said substantially cylindrical component attached on at least one side to an irregularly-shaped component, a fillet formed between said irregularly-shaped component and said substantially cylindrical component, the inductor comprising:

an active partial inductor formed from an electrically conductive material, said active partial inductor comprising:

an active facing surface;

a through opening forming a first active coil segment and a second active coil segment disposed on opposing sides of said through opening;

an active partial opening in either said first or second active coil segment, said first partial opening having an arcuate surface divided by an orifice, said orifice dividing said arcuate coil surface into a first pair of coil lips, said first pair of coil lips forming an interface region with adjoining said first facing surface wherein said first pair of coil lips are profiled to selectively compensate for the irregular mass of said irregularly-shaped component, an opening on the surface of said substantially cylindrical component, or selective heating of said fillet;

means for connecting to the output of an ac high frequency power supply; and an at least one first magnetic flux concentrator segment having at least two facing surfaces, each one of said at least one first magnetic flux concentrator segment disposed partially around a flux concentrator area of said active partial inductor; and a first passive partial inductor comprising:

a first passive facing surface;

a through opening forming a first passive coil segment and a second passive coil segment disposed on opposing sides of said through opening; and a first passive partial opening in either said first or second passive coil segment, said first passive partial opening having an arcuate surface;

a second passive partial inductor, said second passive partial inductor disposed within said first passive partial inductor and electrically isolated from said first passive partial comprising:

a second passive facing surface, said first and second passive facing surfaces in combination disposed substantially adjacent to and electrically isolated from said active facing surface;

a through opening forming a third passive coil segment and a fourth passive coil segment disposed on opposing sides of said through opening;

a second passive partial opening in either said third or fourth passive coil segment adjacently disposed with said first passive partial opening in either said first or second passive coil segment, said first passive partial opening having an arcuate surface, said first and second passive partial openings in combination disposed substantially adjacent to said active partial opening to form a substantially closed coil opening around said at least one substantially cylindrical component; and an at least one second magnetic flux concentrator segment having at least two facing surfaces, each one of said least one second magnetic flux concentrator segment disposed partially around a flux concentrator area of said first and second passive partial inductors; each one of said at least two facing surfaces having a corresponding opposing one of said at least two facing surfaces on one of said at least one first magnetic flux concentrator segment, whereby said active partial inductor is inductively coupled with said first and second passive partial inductors.

30. The inductor of claim 29 wherein said arcuate coil surfaces of adjacently disposed said first and second partial openings is profiled to control the shape of said magnetic field in the vicinity of said one of pre-selected first or second substantially cylindrical components to be heated within said substantially closed inductor.

31. The inductor of claim 29 further comprising an orifice in the arcuate coil surface of each one of adjacently disposed said first and second partial openings, said orifice dividing the arcuate coil surface into a pair of coil lips, wherein said coil lips are profiled to control the shape of said magnetic field in the vicinity of said one of pre-selected first or second substantially cylindrical components to be heated within said substantially closed inductor.

32. An induction heat treatment system for the heat treatment of a crankshaft having an arrangement of substantially cylindrical mains and pins separated from each other by an irregularly-shaped web and axially terminated with one or more end elements, a fillet formed between each one of said irregularly-shaped web and adjacent main or pin, said mains and end elements coaxially arranged along the main axis of the crankshaft, and each one of said pins having an independent axis offset from and in parallel with the main axis, the induction heat treatment system comprising:

at least one ac high frequency power supply;

a plurality of induction heat treatment stations, each one of said plurality of heat treatment stations inductively heating one or more pre-selected mains, pins and end elements, each of said plurality of induction heat treatment stations comprising:

a first pallet assembly comprising:

a first base plate;

at least one first inductor segment formed from a solid electrically conductive material, each of said at least one first inductor segment having a first facing surface and an interior through opening, said through opening forming a first coil segment and a second coil segment, the side of each one of said at least one first inductor segment opposing said first facing surface adjoining said first base plate, either one of said first or said second coil segments having a first partial crankshaft component opening, said first partial crankshaft component opening having a generally arcuate coil surface, each of said at least one first inductor segment having means for connecting said first inductor segment to the output of one of said at least one ac high frequency power supply;

an at least one first magnetic flux concentrator segment having at least two facing surfaces, each of said at least one first magnetic flux concentrator segment disposed partially around a flux concentrator area of said at least one first inductor segment;

means for positive axial location of said crankshaft; and means for seating said crankshaft in first pallet assembly;

a second pallet assembly comprising:

a second base plate;

at least one second inductor segment formed from a solid electrically conductive material, each of said at least one second inductor segment having a second facing surface and an interior through opening, said interior through opening forming a third coil segment and a fourth coil segment, the side of each one of said at least one second inductor segment opposing said second facing surface adjoining said second base plate, either one of said third or said fourth coil segments having a second partial crankshaft component opening, the facing surface and interior through opening of each one of said at least one second inductor segment having a corresponding opposing first facing surface and interior opening in said at least one first inductor segment, said second partial crankshaft component opening having a generally arcuate coil surface, each of said second partial crankshaft component opening having a corresponding opposing first partial crankshaft component opening in said at least one first inductor segment; and an at least one second magnetic flux concentrator segment having at least two facing surfaces, each one of said at least two facing surfaces having an opposing facing surface in said at least one first magnetic flux concentrator segment, each one of said least one second magnetic flux concentrator segment disposed partially around a flux concentrator area of said at least one second inductor segment; and a dielectric material disposed on the facing surface of each one of said at least one first inductor segment or said at least one second inductor segment; and a crankshaft transport system to move said crankshaft between said plurality of heat treatment stations, said crankshaft transport system cooperatively engaging said crankshaft with said means for positive axial location of said crankshaft to axially locate said crankshaft in said first pallet assembly;

a crankshaft positioning system to rotatively orient each one of said one or more pre-selected pins for heat treatment; and means for selectively moving said second pallet assembly adjacent to said first pallet assembly whereby all faces of said at least one second inductor segment and said at least one second magnetic flux concentrator segment are adjacent to said corresponding opposing facing surfaces of said at least one first inductor segment and said at least one first magnetic flux concentrator segment, respectively, and each of said first partial crankshaft component opening and corresponding opposing second partial crankshaft component opening form a substantially closed inductor within which one of said pre-selected mains, pins and end elements is heated by a magnetic field generated by said substantially closed inductor in response to excitation by high frequency ac current from said at least one ac high frequency supply.

33. The induction heat treatment system of claim 32 wherein said crankshaft positioning system is integral with said crankshaft transport system whereby said crankshaft is rotatively oriented while said crankshaft transport system moves said crankshaft to each one of said at least two heat treatment stations prior to seating said crankshaft.

34. The induction heat treatment system of claim 32 wherein said crankshaft positioning system is integral with said second pallet assembly.

35. The induction heat treatment system of claim 32 wherein said crankshaft positioning system further comprises at least one height block to rotatively orient at least one pin of said crankshaft in at least one of said plurality of treatment stations in which said at least one pin is not pre-selected for heat treatment.

36. The induction heat treatment system of claim 35 wherein said at least one height block further provides said means for positive axial location of said crankshaft.

37. The induction heat treatment system of claim 32 wherein the length of each concentrator segment, $x_1$, is at least greater than 0.5 times the axial width of said one of said pre-selected mains and pins when said pins are conventional pins.

38. The induction heat treatment system of claim 32 wherein the length of each concentrator segment, $x_1$, is at least greater than 0.25 times the axial width of said one of said pre-selected pins when said pins are double-width or split pins.

39. The induction heat treatment system of claim 32 wherein the length of each concentrator segment, $x_1$, is greater than 0.75 the axial width of said through openings in said at least one first inductor and said at least one second inductor for said one of said pre-selected mains and pins when said pins are conventional pins.

40. The induction heat treatment system of claim 32 wherein the length of each concentrator segment, $x_1$, is greater than 0.45 the axial width of said through openings in said at least one first inductor and said at least one second inductor for said one of said pre-selected pins when said pins are double-width or split pins.

41. The induction heat treatment system of claim 32 further comprising a spacer interposed between said first base plate and at least one of said at least one first inductor segment or between said second base plate and at least one of said at least one second inductor segment.

42. The induction heat treatment system of claim 32 further comprising a quenching system to supply quenchant to at least one of said one or more pre-selected pins, mains or end elements within said substantially closed inductor.

43. The induction heat treatment system of claim 42 further comprising at least one continuous passage through said first base plate and at least one of said at least one first inductor segment, or at least one continuous passage through said second base plate and at least one of said at least one second inductor segment to supply quenchant to at least one of said one or more pre-selected pins, mains or end elements within said substantially closed inductor.

44. The induction heat treatment system of claim 32 wherein said means for selectively moving comprises rotatable connecting means between said first and second pallet assemblies.

45. The induction heat treatment system of claim 32 further comprising a fixture plate attached to said first base plate and removably attached to a foundational structure whereby said first and second pallet assemblies can be unitarily removed or installed on said foundational structure.

46. The induction heat treatment system of claim 32 wherein either said first or second arcuate surface of said first or second partial crankshaft component opening, respectively, is divided by an orifice to form a pair of coil lips, said pair of coil lips forming an interface region with said adjoining first or second facing surface, respectively, wherein said pair of coil lips are profiled to selectively compensate for the irregular mass of said irregularly-shaped component, an opening on the surface of one of said pre-selected mains or pins, or selective heating of a fillet.

47. The induction heat treatment system of claim 46 wherein the axial width of each one of said pair of coil lips is profiled to be greater in said interface region than in the vicinity of a base region located approximately 90 degrees offset from said interface region, each one of said coil lips further profiled to a circumferential length, $d_2$, of less than twice the axial width of said one of said pre-selected mains, pins and end elements to be heat treated within the substantially closed inductor, and to an axial transition width, $d_1$, of less than 0.3 times the axial width of said one of said pre-selected mains, pins and end elements to be heat treated within the substantially closed inductor.

48. The induction heat treatment system of claim 47 wherein said pair of coil lips have a circumferential length less than twice the axial width of said one of said pre-selected mains, pins and end elements to be heat treated in said substantially closed inductor, and an axial transition width of less than 0.3 times the axial width of said one of said pre-selected mains, pins and end elements to be heat treated in said substantially closed inductor.

49. The induction heat treatment system of claim 46 wherein said pair of coil lips is further profiled to a narrower axial width adjacent to an opening on the surface of said one of said pre-selected mains, pins and end elements to be heat in said substantially closed inductor.

50. The induction heat treatment system of claim 49 wherein said pair of coil lips is further profiled by a radial recession of each one of said coil lips adjacent to an opening on the surface of said one of said pre-selected first or second substantially cylindrical components to be heat treated within the substantially closed inductor, wherein the width, $a_1$, of said radial recession is less than three times the diameter of said opening.

51. The induction heat treatment system of claim 46 wherein said pair of coil lips are profiled to compensate for an opening on the surface of said one of said pre-selected mains, pins and end elements to be heated in said substantially closed inductor.

52. The induction heat treatment system of claim 32 further comprising at least one side shield disposed on at least one side of said first partial crankshaft component opening or said second partial crankshaft component opening to selectively compensate for the irregular mass of said irregularly-shaped web, an opening on the surface of said pre-selected mains or pins, or selective heating of said fillet associated with said one of said pre-selected mains, pins and end elements to be heat in said substantially closed inductor, said at least one side shield composed of an electrically conductive and magnetic material.

53. The induction heat treatment system of claim 52 wherein said at least one side shield has an edge flush with the adjacent surface of said first partial crankshaft component opening or said second partial crankshaft component opening.

54. The induction heat treatment system of claim 52 wherein said side shield has a receded edge from the adjacent surface of said first partial crankshaft component opening or said second partial crankshaft component opening.

55. The induction heat treatment system of claim 52 wherein said at least one side shield has an array of slotted teeth disposed at least partially around the perimeter of said first or second partial crankshaft component opening wherein the ratio of the width of each slot separating adjacent teeth to the width of each tooth is less than 5.

56. The induction heat treatment system of claim 52 wherein said at least one side shield has an elongated open slot in the vicinity of an opening on the surface of said one of said pre-selected mains, pins and end elements to be heat in said substantially closed inductor wherein the width of the elongated slot is limited to less than three times the diameter of said opening.

57. The induction heat treatment system of claim 32 wherein said first and second partial crankshaft component openings form a substantially closed ovoidal opening to selectively compensate for the irregular mass of said irregularly-shaped component or an opening on the surface of said one of said pre-selected mains, pins and end elements to be heat in said substantially closed inductor.

58. The induction heat treatment system of claim 32 further comprising an electrically conductive compensator, said compensator attached to said first or second inductor segment or adjacent to a void in said irregularly-shaped web.

59. A method of heat treating pre-selected components of a crankshaft having a main axis, said crankshaft comprising two or more mains, two or more pins, a plurality of non-heat treated webs having an unsymmetrical and irregular shape, one of said plurality of non-heat treated webs attached to each adjacent main or pin to form a fillet between each one of said plurality of non-heat treated webs and attaching main or pin, and one or more end elements, said mains and end elements coaxially arranged along the main axis, each one of said pins having an independent axis offset from and in parallel with the main axis, said mains, pins and webs having one or more skewed through passages, each of said passages terminating in an opening on the surface of one of said mains or pins, the method comprising:

engaging said crankshaft;

transporting said crankshaft to an induction heat treatment station;

rotating said crankshaft to properly orient said pre-selected pins for siting within stationary partial inductor openings in said induction heat treatment station;

translating said crankshaft to properly orient said pre-selected mains, pins and end elements for siting within stationary partial inductor openings;

seating said crankshaft in said induction heat treatment station;

positioning non-stationary partial inductors adjacent to the stationary partial inductor openings to form a substantially closed inductor around each one of said pre-selected mains, pins and end elements;

applying an ac high frequency current to each one of said stationary partial inductors;

inductively coupling said ac high frequency current to each one of said non-stationary partial inductors;

inductively heating said pre-selected mains, pins and end elements by a magnetic field established by said ac high frequency current and formed to compensate for the unsymmetrical and irregular shape of a web adjacent to one of said pre-selected mains, pins or end elements and said opening on the surface of one of said mains or pins to produce a substantially uniform heat treatment of said surface;

positioning non-stationary partial inductors away from said stationary partial inductors; and transporting said crankshaft from said induction heat treatment station.

60. The method of claim 59 further comprising the step of quenching said pins, mains and end elements simultaneously or following the step of inductively heating.

61. The method of claim 59 wherein said magnetic field is further modified to heat treat one or more of said fillet between one of said webs and one of said mains or pins.

* * * * *